(12) United States Patent
Perkins

(10) Patent No.: US 11,999,089 B2
(45) Date of Patent: Jun. 4, 2024

(54) TRANSPORTABLE MOLDING SYSTEM FOR FORMING INSULATION ON LONG PIPES AND RELATED METHODS

(71) Applicant: Bayou Holdco, Inc., Houston, TX (US)

(72) Inventor: Randall Perkins, Houston, TX (US)

(73) Assignee: Bayou HoldCo, Inc., Houston, TX (US)

(*) Notice: Subject to any disclaimer, the term of this patent is extended or adjusted under 35 U.S.C. 154(b) by 129 days.

(21) Appl. No.: 17/505,191

(22) Filed: Oct. 19, 2021

(65) Prior Publication Data

US 2022/0118658 A1 Apr. 21, 2022

Related U.S. Application Data

(60) Provisional application No. 63/093,845, filed on Oct. 20, 2020.

(51) Int. Cl.

| | |
|---|---|
| *B29C 45/14* | (2006.01) |
| *B29C 33/02* | (2006.01) |
| *B29C 33/26* | (2006.01) |
| *B29C 33/28* | (2006.01) |
| *B29C 33/30* | (2006.01) |
| *B29C 33/34* | (2006.01) |

(Continued)

(52) U.S. Cl.
CPC ........ *B29C 45/14622* (2013.01); *B29C 33/02* (2013.01); *B29C 33/26* (2013.01); *B29C 33/28* (2013.01); *B29C 33/302* (2013.01); *B29C 33/303* (2013.01); *B29C 33/34* (2013.01); *B29C 45/14598* (2013.01); *B29C 45/261* (2013.01); *B29C 45/34* (2013.01); *B29C 45/80* (2013.01); *B29K 2995/0015* (2013.01); *B29L 2023/225* (2013.01)

(58) Field of Classification Search
CPC ..... B29C 33/302; B29C 33/02; B29C 33/303; B29C 33/34; B29L 2023/225
See application file for complete search history.

(56) References Cited

U.S. PATENT DOCUMENTS

| | | | |
|---|---|---|---|
| 2,053,307 | A | 9/1936 | Wilson |
| 2,119,415 | A | 5/1938 | Bodge |

(Continued)

FOREIGN PATENT DOCUMENTS

| | | |
|---|---|---|
| CN | 202878583 U | 4/2013 |
| CN | 107803926 A | 3/2018 |

(Continued)

*Primary Examiner* — Benjamin A Schiffman
(74) *Attorney, Agent, or Firm* — Stinson LLP

(57) ABSTRACT

A portable molding system is configured for forming insulation on pipes. A set of transportable process modules are configured to be shipped to a molding site, operatively connected together at the molding site to form a site-installed molding system, and subsequently disconnected for transport to another site. The set of transportable process modules includes one or more resin preparation modules configured to prepare resin for being formed into insulation on the pipes. One or more mold modules are configured to define a mold cavity. The one or more mold modules are configured to hold a pipe in the mold cavity, to receive resin prepared by the one or more resin preparation modules in the mold cavity around the pipe, and to form said resin received in the mold cavity into insulation on the pipe.

26 Claims, 16 Drawing Sheets

(51) Int. Cl.
  *B29C 45/26* (2006.01)
  *B29C 45/34* (2006.01)
  *B29C 45/80* (2006.01)
  *B29L 23/00* (2006.01)

(56) References Cited

U.S. PATENT DOCUMENTS

| | | | |
|---|---|---|---|
| 3,359,351 A | 12/1967 | Bender | |
| 3,718,309 A | 2/1973 | Harris | |
| 3,876,355 A | 4/1975 | Baughmann | |
| 3,885,587 A * | 5/1975 | Troope | B01F 35/88 366/147 |
| 3,889,919 A | 6/1975 | Ladney, Jr. | |
| 3,929,166 A | 12/1975 | Westerheid | |
| 3,948,292 A | 4/1976 | Goto et al. | |
| 4,376,512 A * | 3/1983 | Kistner | B05B 12/1418 239/304 |
| 4,522,578 A | 6/1985 | Martin, Jr. et al. | |
| 4,909,972 A | 3/1990 | Britz | |
| 5,340,512 A * | 8/1994 | Slocum | B29B 7/7476 425/408 |
| 5,356,580 A | 10/1994 | Clark et al. | |
| 5,491,880 A | 2/1996 | Labiche | |
| 5,662,841 A | 9/1997 | Guergov | |
| 5,817,347 A | 10/1998 | Tamcsin et al. | |
| 6,058,979 A | 5/2000 | Watkins | |
| 6,199,593 B1 | 3/2001 | Schmiade | |
| 6,827,710 B1 | 12/2004 | Mooney et al. | |
| 7,195,730 B2 | 3/2007 | Calderoni et al. | |
| 8,950,071 B2 | 2/2015 | Knecht | |
| 10,357,907 B2 | 7/2019 | Perkins | |
| 2005/0194705 A1 * | 9/2005 | Smith | B29B 7/603 264/40.5 |
| 2006/0032588 A1 | 2/2006 | Appleby et al. | |
| 2007/0182071 A1 | 8/2007 | Sekido et al. | |
| 2013/0032960 A1 * | 2/2013 | Russo | B29C 49/0021 264/40.5 |
| 2013/0170913 A1 | 7/2013 | Hoffmann | |
| 2013/0185923 A1 | 7/2013 | Jensen | |
| 2013/0330434 A1 * | 12/2013 | Wilkie | B29C 48/916 425/62 |
| 2015/0044320 A1 | 2/2015 | George et al. | |
| 2016/0243736 A1 | 8/2016 | Stier | |
| 2017/0045178 A1 * | 2/2017 | Hoffmann | F16L 59/20 |
| 2017/0106574 A1 * | 4/2017 | Gandolfi | B29C 45/46 |
| 2017/0355112 A1 * | 12/2017 | Perkins | B29C 45/14073 |
| 2017/0355114 A1 | 12/2017 | Perkins | |
| 2018/0043584 A1 | 2/2018 | Feng et al. | |
| 2018/0290340 A1 * | 10/2018 | Chan | B29C 39/38 |
| 2021/0331199 A1 * | 10/2021 | Smith | B01F 23/45 |

FOREIGN PATENT DOCUMENTS

| | | |
|---|---|---|
| CN | 108656339 A | 10/2018 |
| CN | 209395135 U | 9/2019 |
| CN | 209395136 U | 9/2019 |
| DE | 10314032 A1 | 10/2004 |
| DE | 102011009333 A1 | 7/2012 |
| EP | 2305443 A1 | 4/2011 |
| GB | 1220349 A | 1/1971 |
| GB | 2234570 A | 2/1991 |
| JP | 2006349047 A | 12/2006 |
| WO | 2000047387 A1 | 8/2000 |
| WO | 2004024411 A1 | 3/2004 |
| WO | 2009109776 A2 | 9/2009 |
| WO | 2020058769 A | 3/2020 |

* cited by examiner

TRANSPORTABLE MOLDING SYSTEM FOR FORMING INSULATION ON LONG PIPES AND RELATED METHODS

CROSS-REFERENCE TO RELATED APPLICATIONS

This application claims priority to U.S. Provisional Patent Application Serial No. 63/093,845, filed Oct. 20, 2020, which is hereby incorporated by reference for all purposes.

FIELD

This disclosure generally pertains to a molding system for applying insulation to a pipe. In particular, this disclosure pertains to molding systems for forming reaction-cured polymer insulation on long pipes (e.g., pipes of 20 feet in length or greater), commonly used in subsea oil and gas exploration and extraction.

BACKGROUND

Another molding system of the general type disclosed herein is described in U.S. Patent Publ. No. 2017/0355114, which is hereby incorporated by reference in its entirety.

The inventors have recognized that long (e.g., 20-foot or greater, 30-foot or greater, 40-foot or greater) insulated pipes of the type used in subsea oil and gas exploration and extraction are costly to manufacture remotely and then ship to the field where they will be put to use. However, it is not practical for end users to undertake the capital expenditure and effort of setting up and staffing a permanent molding system installation onsite.

SUMMARY

In one aspect, a portable molding system configured for forming insulation on pipes of lengths in excess of 20 feet comprises a set of transportable process modules configured to be shipped to a molding site, operatively connected together at the molding site to form a site-installed molding system, and subsequently disconnected for transport to another site. The set of transportable process modules includes one or more resin preparation modules configured to prepare resin for being formed into insulation on the pipes. One or more mold modules are configured to define a mold cavity. The one or more mold modules configured to hold a pipe in the mold cavity, to receive resin prepared by the one or more resin preparation modules in the mold cavity around the pipe, and to form said resin received in the mold cavity into insulation on the pipe.

In another aspect, a method of forming a skid for use in a portable molding system comprises forming a skid base having a top. A plurality of mounting plates are temporarily secured to the top at defined positions corresponding with defined positions of equipment in the skid. The equipment is positioned on the corresponding mounting plates on the skid base. One or more of the plurality of mounting plates are broken from the top. Said one or more of the mounting plates are moved to align with the respective equipment. Subsequently, all of the mounting plates are permanently secured in position.

In another aspect, a method of forming insulated pipes comprises shipping a plurality of transportable process modules of a portable pipe insulation molding system to a molding site. Releasable communication connections between the transportable process modules are made at the molding site. Releasable fluid connections between the plurality transportable process modules are made at the molding site. Resin is imparted from a bulk resin storage source at the molding site to transportable process modules. The transportable process modules are used to condition the resin, mix the conditioned resin with catalyst, and impart the mixed resin into a mold cavity around a pipe at the molding site. The resin is cured in the mold cavity to form an insulated pipe at the molding site.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

As explained more fully below, the present disclosure is directed to a pipe insulation molding system that has a modular construction, which enables the entire system to be containerized and shipped from site-to-site as the need for long insulated pipes arises.

Figure 1:
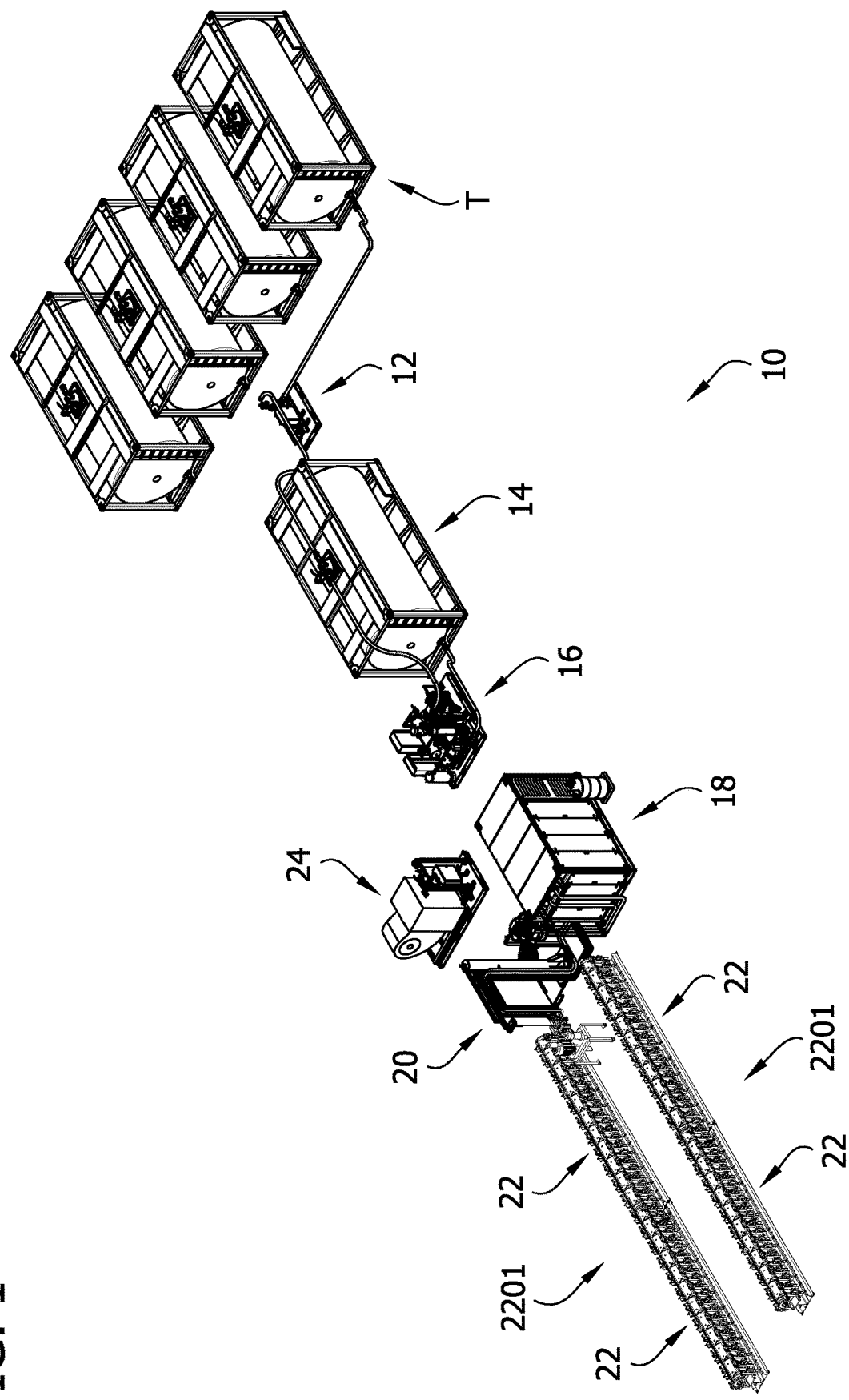
FIG. 1 is a perspective of a portable molding system deployed at a molding site.

Referring to FIG. 1, an exemplary embodiment of a portable system for molding pipe insulation onto lengths of pipe is generally indicated at reference number 10. In the illustrated embodiment, the molding system 10 is configured for molding pipe insulation onto long pipes with lengths of 20 feet or greater (e.g., 40 feet or greater), but in other configurations, the molding system 10 could be used to apply insulation on shorter pipes, e.g., pipes as short as 4 feet in length. The portable molding system 10 is made up of a set of discrete transportable process modules 12, 14, 16, 18, 20, 22, 24. The process modules are generally configured to be shipped to a molding site, operatively connected together at the molding site to form a site-installed molding system, used onsite as an integrated molding system to form insulated pipes, and subsequently disconnected and containerized for transport to another molding site.

The illustrated portable molding system 10 broadly comprises one or more resin transfer modules 12, 14, one or more resin preparation modules 16, 18, 20 and one or more mold modules 22. The resin transfer modules 12, 14 are generally configured to transfer resin from a tank farm T (broadly, bulk storage) located at the molding site to the one or more resin preparation modules 16, 18, 20. As described more fully below, the illustrated resin transfer modules are comprised of one transfer pump module 12 and one intermediate storage tank module 14. The resin preparation modules 16, 18, 20 are generally configured to prepare resin for being formed into insulation on the pipes. The illustrated resin preparation modules are comprised of one resin conditioning module 16, one mixed metering module 18, and a mixing module 20. The one or more mold modules 22 are configured to repeatably receive prepared resin in a mold cavity to form the prepared resin into insulation on individual pipes. The illustrated portable molding system 10 further comprises a temperature control module 24 configured to control the temperature of the mold modules 22 during a molding process.

Figure 2:
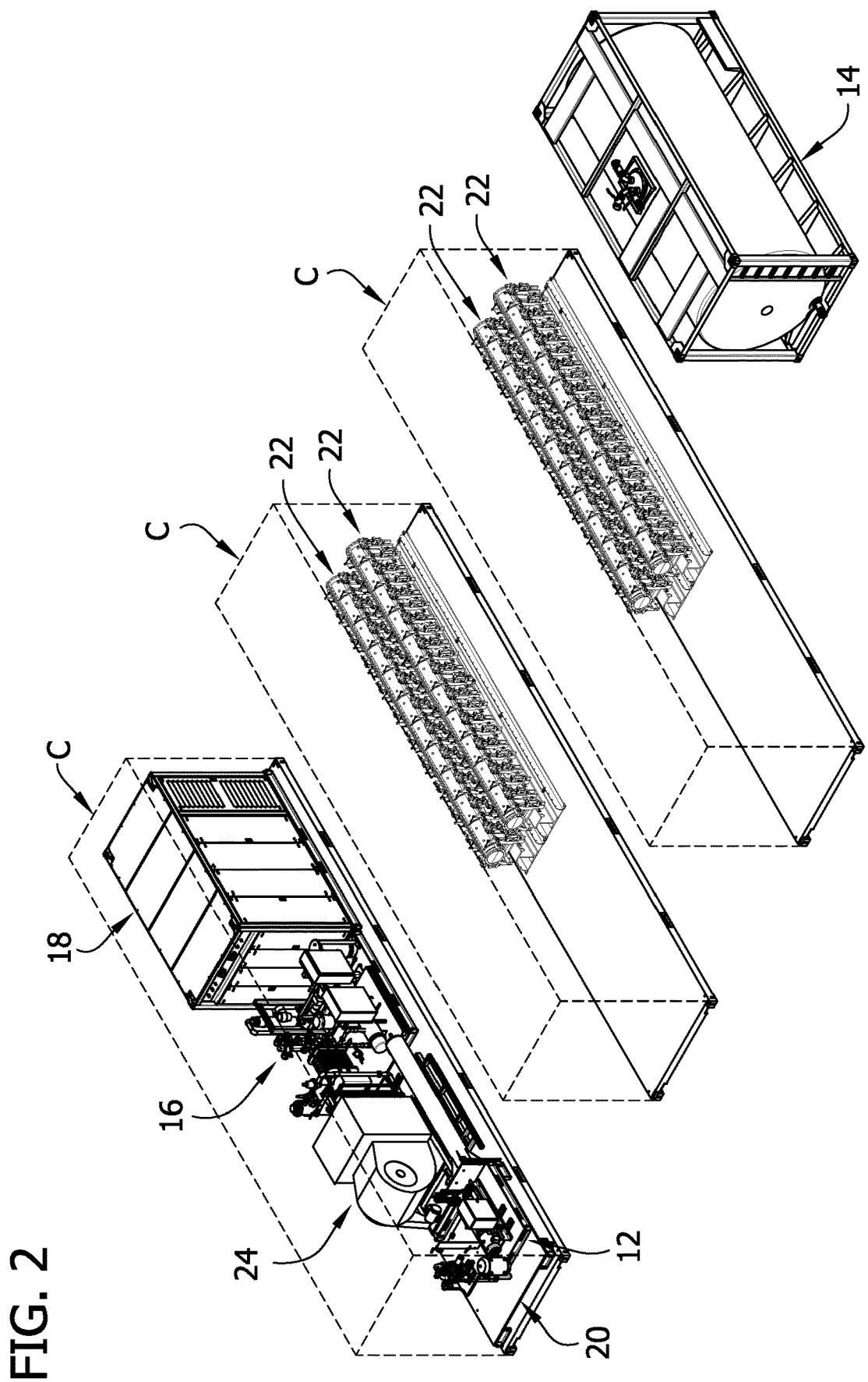
FIG. 2 is a perspective of the portable molding system packed in standard forty-foot shipping containers shown transparently in broken line.

Referring to FIG. 2, each of the process modules 12, 16, 18, 22, 24 is generally configured to be shipped intact as a single unit in a standard-size shipping container C. In the illustrated embodiment, the mixing module 20 disassembles and folds down inside the container C. Some of the modules can be shipped two- or more-to-a-container. FIG. 2 shows the modules 12, 16, 18, 20, 22, and 24 containerized for shipping in standard forty-foot shipping containers C. Those skilled in the art will recognize that standard shipping containers have a width of less than or equal to 96 inches (about 244 cm) and a height of less than or equal to 102 inches (about 260 cm). The mold modules 22 are configured to be shipped two-to-a-container. For example, in one or more embodiments, the mold modules 22 are packed side-by-side in a standard size container C. In the illustrated embodiment, the intermediate storage tank module 14 is itself a transportable vessel such as Eurotainer or Isotainer. However, it is also contemplated that the intermediate storage tank module could be shipped in a larger shipping container with the other modules without departing from the scope of the disclosure.

At least some of transportable process modules 12, 16, 18, 20, 22, 24 include active components (e.g., electronically actuatable devices such as motors, pumps, solenoids, valves, or the like) configured to perform a dedicated function within the molding system 10. As explained more fully below, the intermediate storage tank 14 functions as a passive module within the molding system but may have one or more sensors for providing information to the system at large. The modules 12, 14, 16, 18, 20, 22, and 24 are configured to be communicatively connected onsite so that the molding system 10 can be controlled as a single integrated molding process. In an exemplary embodiment, each of a plurality of the active modules 12, 16, 18, 24 comprises one or more dedicated control processors 122, 161, 188, 2407, such as an Omron PLC, and the control processors configured to be interconnected for communication onsite. In a preferred embodiment, the control processors 122, 161, 188, 2407 are interconnected onsite by wired Cat 5 Ethernet lines that provide robust, reliable communications. One of the dedicated control processors 188 comprises is a supervisory control processor configured to coordinate control of the active modules 12, 16, 18, 20, 22, and 24. In the illustrated embodiment, the supervisory control processor 188 is located on the mixed metering module 18, as discussed further below.

The molding system 10 requires no permanent piping to deploy. Instead, the modules 12, 14 16, 18, 20, 22, and 24 and the tanks of the tank farm T interconnect via a plurality of flexible hoses (e.g., 3-inch hoses) of up to a maximum length in an inclusive range of from about 200 feet to about 300 feet. In an exemplary embodiment, the hoses are cut to length for the particular end user deployment configuration and hose fittings are installed on the ends of the hoses for fluidly connecting to the modules. Hose cutting and installation of hose fittings may be performed offsite such that pre-terminated hoses of the appropriate length are shipped to the site and quickly installed to fluidly connect the molding system 10. Alternatively, hoses can be cut and terminated with fittings onsite (e.g., via a hose crimping machine) in certain embodiments.

To make the molding system adaptable to various end user site configurations, the molding system 10 is configured so that only a minimal amount of equipment requires shelter from the elements during use. In the illustrated embodiment, the mold modules 22 and the mixing module 20 should be deployed in an onsite building or temporary structure, but all other modules 12, 14, 16, 18, 24 can be deployed outdoors. At least the transfer pump module 12, the resin intermediate storage tank module 14, the resin conditioning module 16, and the temperature control module 24 are all fitted with outdoor-rated electronic components. In an exemplary embodiment, all of the modules 12, 14, 16, 18, 20, 22, 24 are fitted with outdoor-rated electronic components. In the illustrated embodiment, the mixed metering module 18 is enclosed to protect the internal components from the elements.

Figure 3:
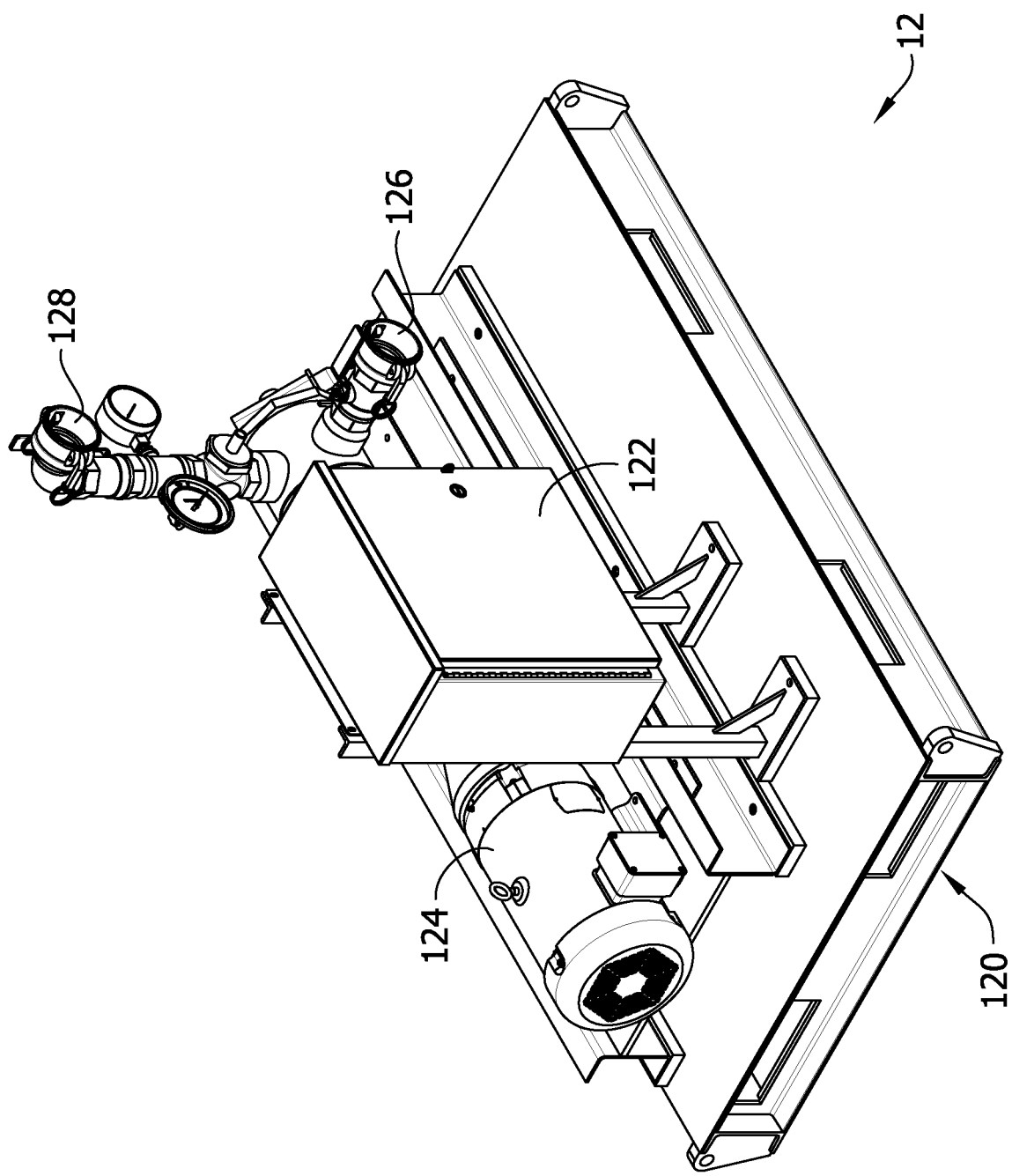
FIG. 3 is a perspective of a transfer pump module.

Referring to FIG. 3, the transfer pump module 12 comprises a skid-mounted pump system configured to pump resin from the on-site tank farm T (or other bulk resin storage), which stores large quantities of bulk resin. The illustrated transfer pump module 12 comprises a skid 120, an enclosed control processor 122 mounted on the skid, a resin pump 124 mounted on the skid, a resin inlet 126, and resin outlet 128. In use, one of the flexible hoses connects the resin inlet 126 to the tank farm T, and another flexible hose connects the resin outlet 128 to the intermediate storage tank module 14. The resin pump 124 is configured to pump resin from the tank farm T into the intermediate storage tank module 14 where it is held before or while being conditioned. In certain embodiments, the transfer pump module 12 is located closer to the tank farm T than the resin intermediate storage tank module 14 (e.g., the length of a first flexible hose between the tank farm and the transfer pump module is less than the length of a second flexible hose between the transfer pump module and the intermediate storage tank module).

Figure 4:
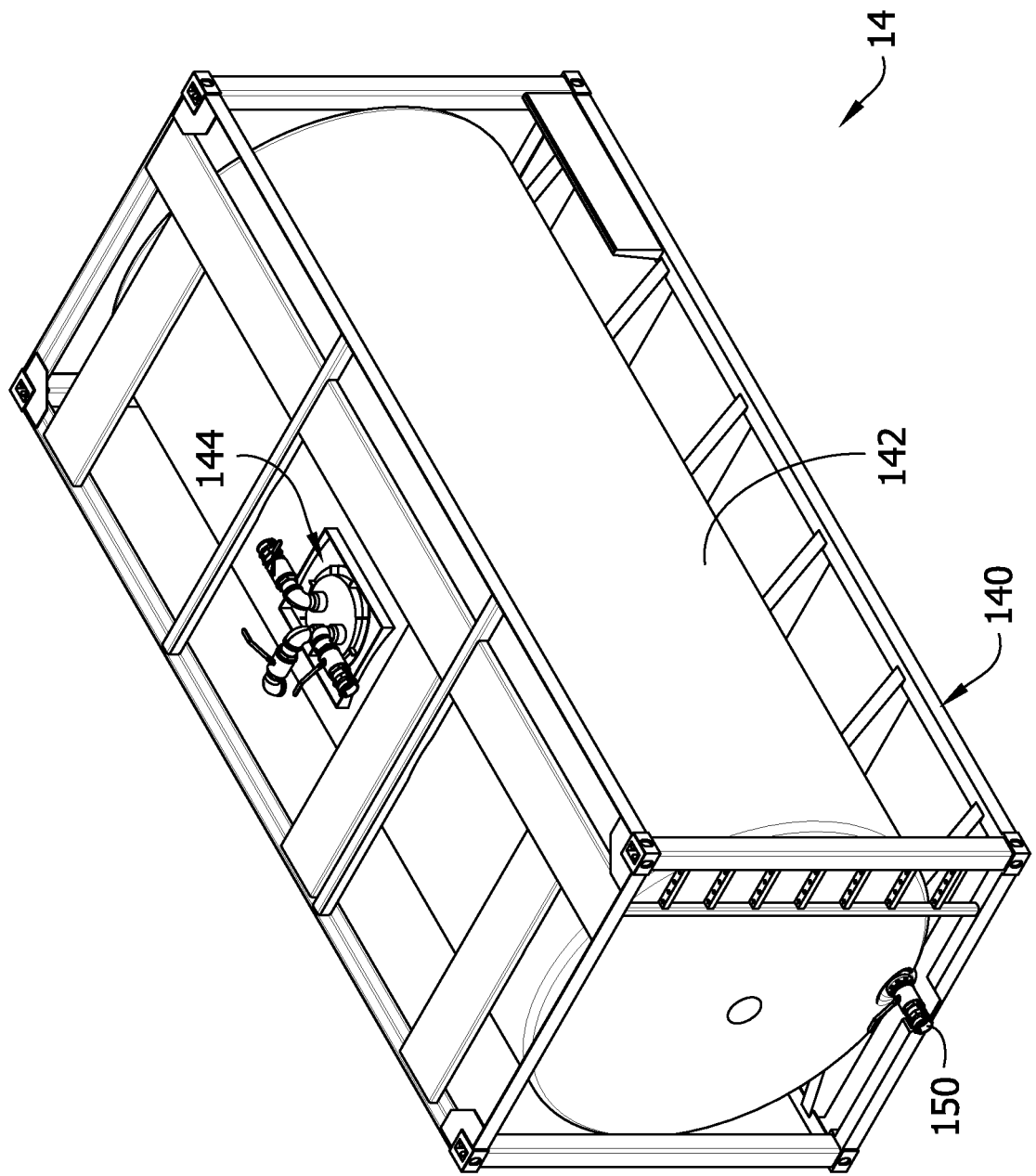
FIG. 4 is a perspective of an intermediate storage tank module.

Referring to FIG. 4, the intermediate storage tank module 14 is a trailer-, truck-, or skid-mounted liquid tank (e.g., an Isotainer or a Eurotainer). Conventionally, these types of tanks include an upper hatch and a lower outlet valve. In the prior art, these types of tanks can be filled by opening the hatch and placing a hose through the open hatch. However, in certain embodiments, the molding system 10 may be used to form insulation from resin that should not be directly exposed to the environment in this manner. Further, as will be explained below, the illustrated intermediate storage tank module 14 is configured to receive fluid from two different sources: (1) the upstream tank farm T and (2) the resin conditioning module 16. When the intermediate storage tank module 14 is partially or substantially empty, the transfer pump module 12 pumps new resin into the intermediate storage tank module from the upstream tank farm T. (The tanks T may be filled by a resin provider offsite and delivered full to the end user site.) In some applications, the conditioning module 16 will condition and recirculate the resin contained in the intermediate storage tank 14 until the mixed metering module 18 calls for conditioned resin downstream.

Figure 5:
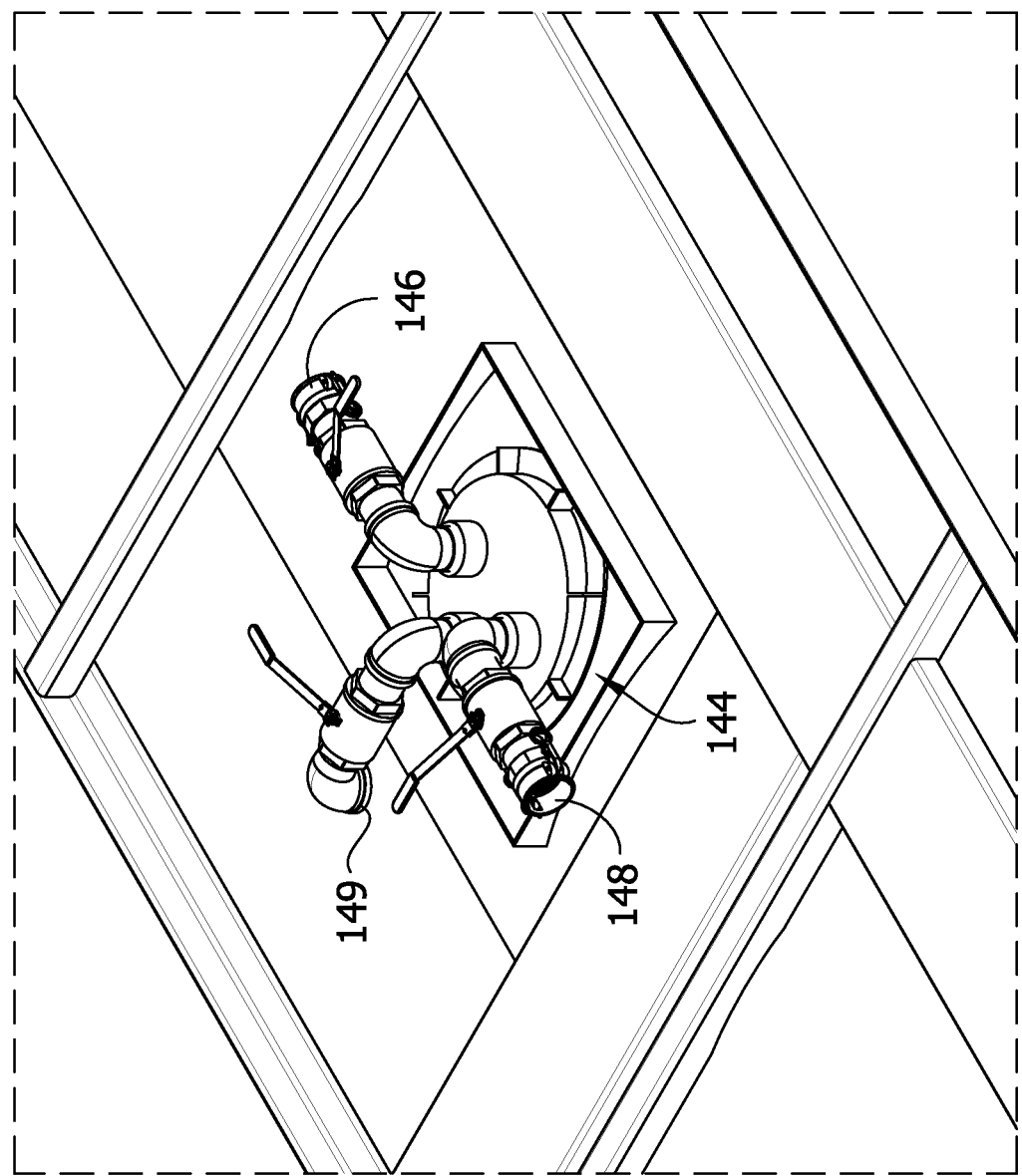
FIG. 5 is an enlarged perspective of a portion of the intermediate storage tank module including a hatch cover.

The illustrated intermediate storage tank module 14 comprises a support frame 140 and a tank 142 mounted on the support frame. The tank 142 includes an upper hatch, and the intermediate storage tank module 14 further includes a hatch cover 144 covering the hatch. The hatch cover 144 is suitably a universal hatch cover configured to cover the hatch of various types of liquid tanks which may be used for the resin intermediate storage tank 14. Referring to FIG. 5, the illustrated hatch cover 144 includes first and second inlet fittings 146, 148 that are received in ports through the body of the hatch cover. The first inlet fitting 146 is configured to fluidly connect the intermediate storage tank 14 to the transfer pump 12, or more broadly, to an outlet of the tank farm T. More particularly, one of the flexible hoses runs from the outlet 128 of the resin transfer pump module 12 to the first inlet fitting 146. The second inlet fitting 148 is configured fluidly connect the intermediate storage tank 14 to the resin conditioning module 16 via another one of the flexible hoses. The inlet fittings 146, 148 are connected to one or more dip tubes (not shown) that extend downward from the fittings toward the bottom of the tank. The dip tubes direct the resin imparted through the inlet fittings to enter the intermediate storage tank module 14 in the lower portion of the tank. The illustrated hatch cover 144 further comprises a vent fitting 149 to provide pressure relief In one or more embodiments, the vent fitting 149 may be connected to a desiccant dryer (not shown). In an exemplary embodiment, the resin intermediate storage tank 14 is further fitted with a level sensor (not shown) and a pressure sensor (not shown). In certain embodiments, these control components may connect to one or more communication ports located on the hatch cover. The ports are at ends of passages formed through the hatch cover. In an exemplary embodiment, the intermediate storage tank module 14 further comprises an outlet 150 (FIG. 4) on the bottom of the tank 142. Another flexible hose connects the outlet of the intermediate storage tank module to the resin conditioning module 16.

Figure 6:
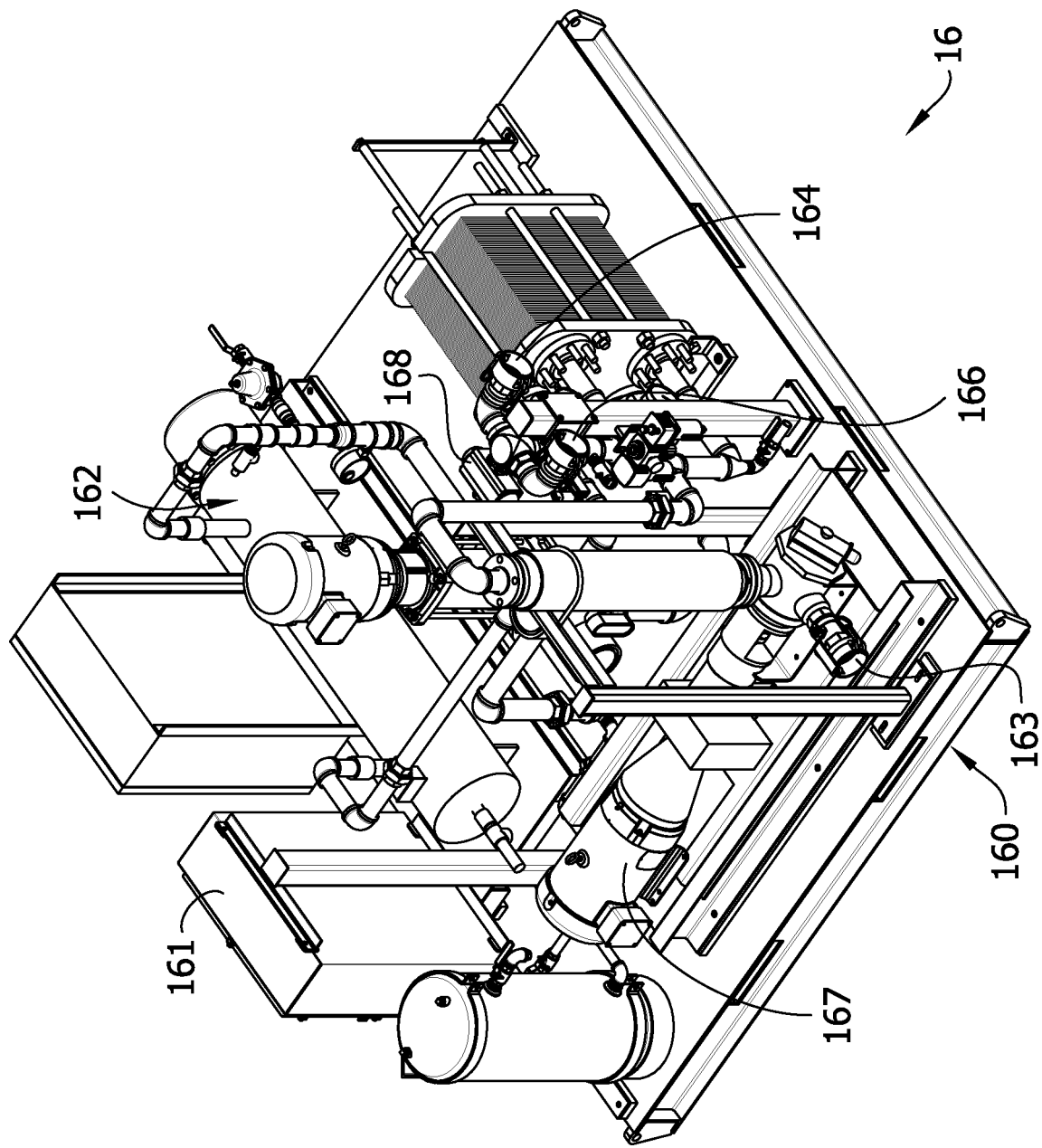
FIG. 6 is a perspective of a resin conditioning module.

Referring to FIG. 6, the resin conditioning module 16 comprises a skid 160, an enclosed dedicated control processor 161 mounted on the skid, a hydronic boiler 162 (broadly, heat exchange system) mounted on the skid, an inlet 163, a recirculation outlet 164, a distribution outlet 166, passaging operatively connecting the inlet and outlets to the hydronic boiler, and a pump 167 for pumping resin through the passaging. In general, the resin conditioning module 16 is configured to use the boiler 162 to heat resin to process temperature. The dedicated control processor 161 can be connected to suitable temperature sensing equipment and use temperature signals from the temperature sensing equipment to execute thermostatic control of the boiler 162 to achieve the desired process temperature. To connect the resin conditioning module 161 to the broader molding system 10, one flexible hose fluidly connects the recirculation outlet 164 to the recirculation inlet 148 of the intermediate storage tank module 14, another flexible hose fluidly connects the inlet 163 to the outlet 150 of the intermediate storage tank module, and yet another flexible hose fluidly connects the distribution outlet 168 to the mixed metering module 18.

The passaging of the resin conditioning module 16 includes one or more valves 168 (e.g., a three-way valve) between the hydronic boiler 12 and the outlets 164, 166. The three-way valve 168 is adjustable to direct pumped and heated resin to either (i) recirculate through the recirculation outlet 164 back to the intermediate storage tank module 14 or (ii) distribute through the distribution outlet 166 to the mixed metering module 18. Thus, in an exemplary embodiment, the valve 168 comprises a three-way valve adjustable between a recirculation position in which the valve 168 provides fluid communication between the inlet 163 and the recirculation outlet 164 and a distribution position in which the valve provides fluid communication between the inlet and the distribution outlet 166. The pump 167 is configured to pump resin from the inlet 163 through the passaging and hydronic boiler 162 to one of the outlets 164, 166, depending on the position of the three-way valve 168.

The conditioning module 16 is configured to be selectively used in either of two operating modes: recirculation and pass-through. Typically, the conditioning module 16 will be operated in a recirculation mode in which resin recirculates through the conditioning module 16 and the resin intermediate storage tank 14 to maintain the entire contents of the resin intermediate storage tank at temperature until there is a call for heated resin from the mixed metering module 18. However, the conditioning unit 16 is also powerful enough to be run as a one-pass or pass-through device. In other words, the boiler 162 is capable of bringing resin from ambient to process temperature as it passes directly through the conditioning unit from the intermediate storage tank 14 to the mixed metering unit 18.

Figure 7:
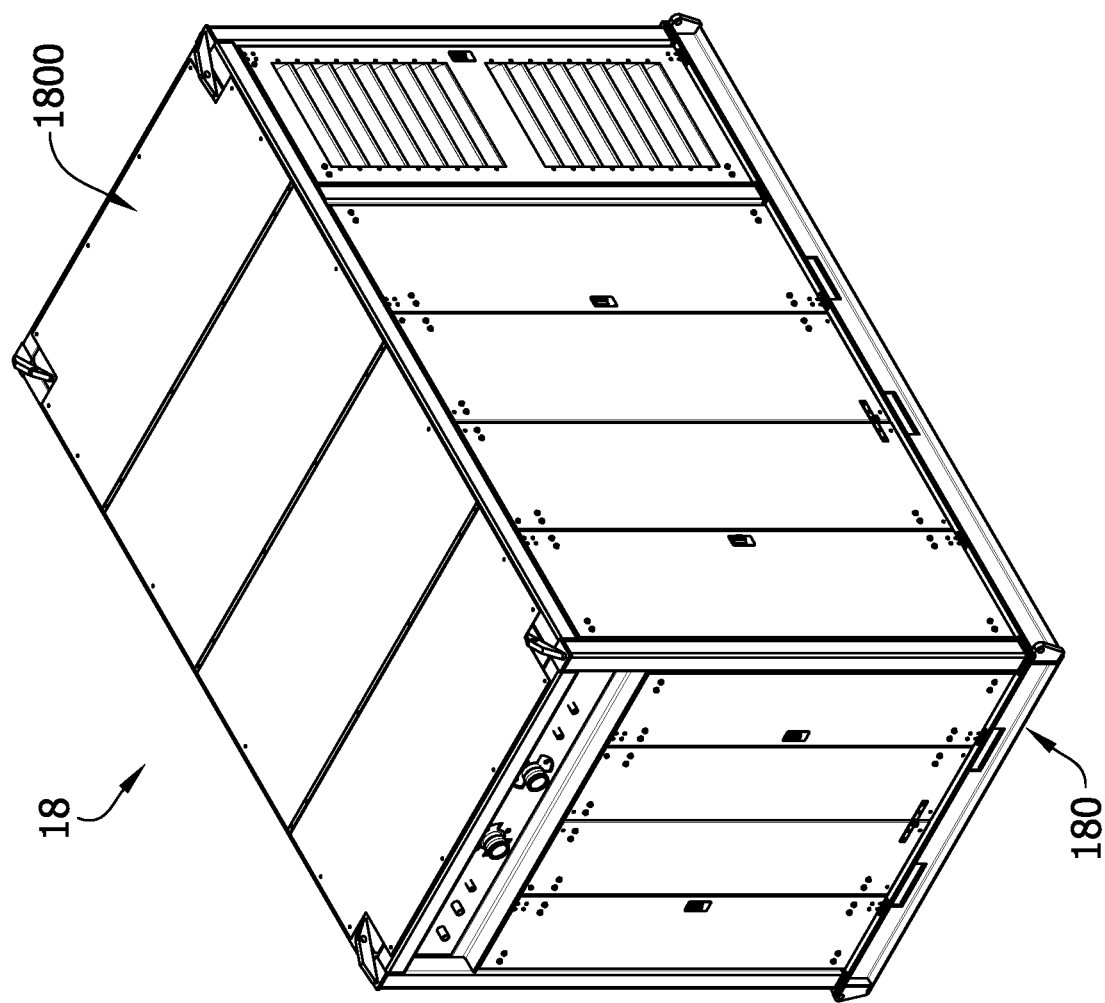
FIG. 7 is a perspective of a mixed metering module.
Figure 8:
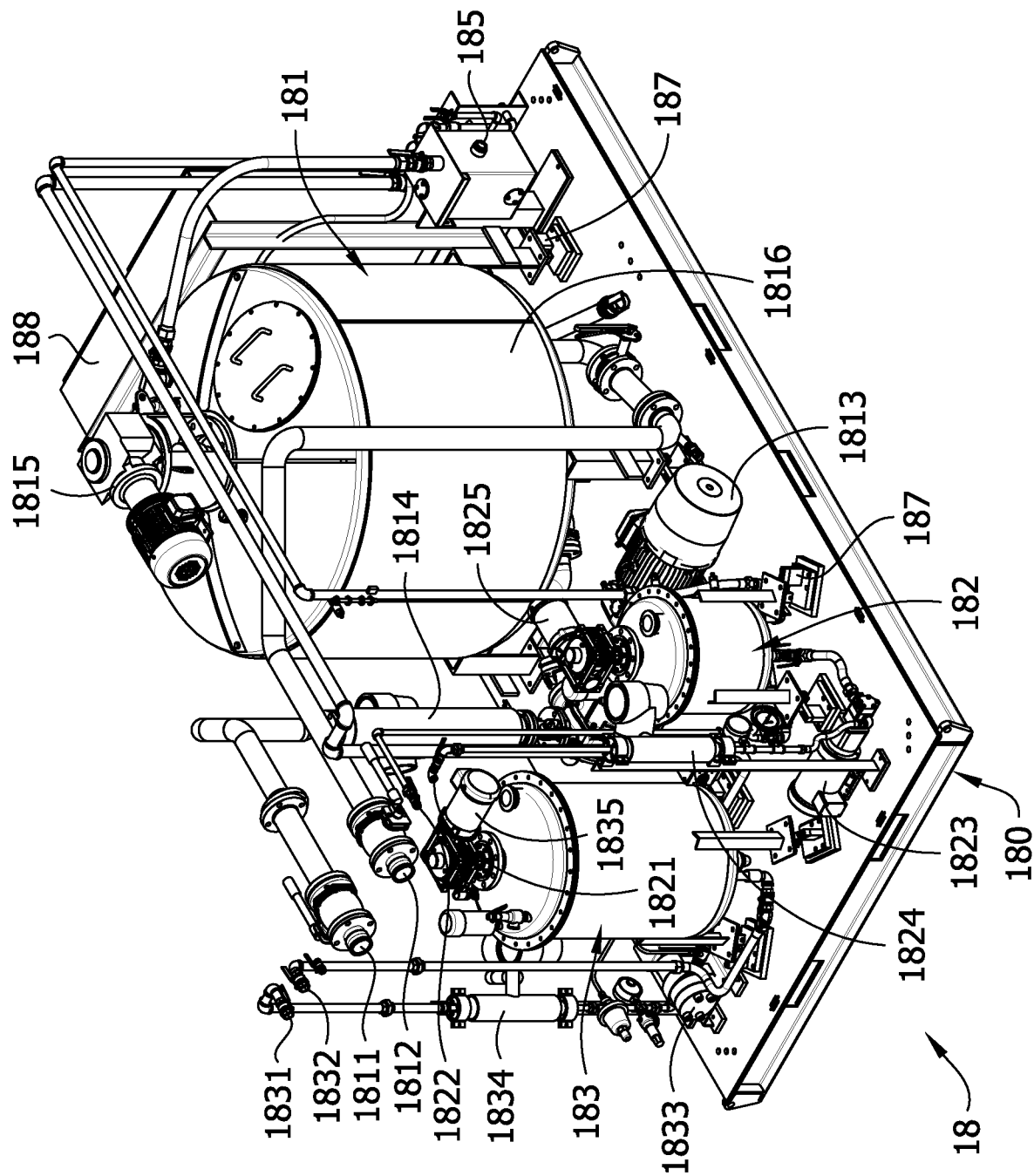
FIG. 8 is a perspective of the mixed metering module with an enclosure thereof removed.
Figure 9:
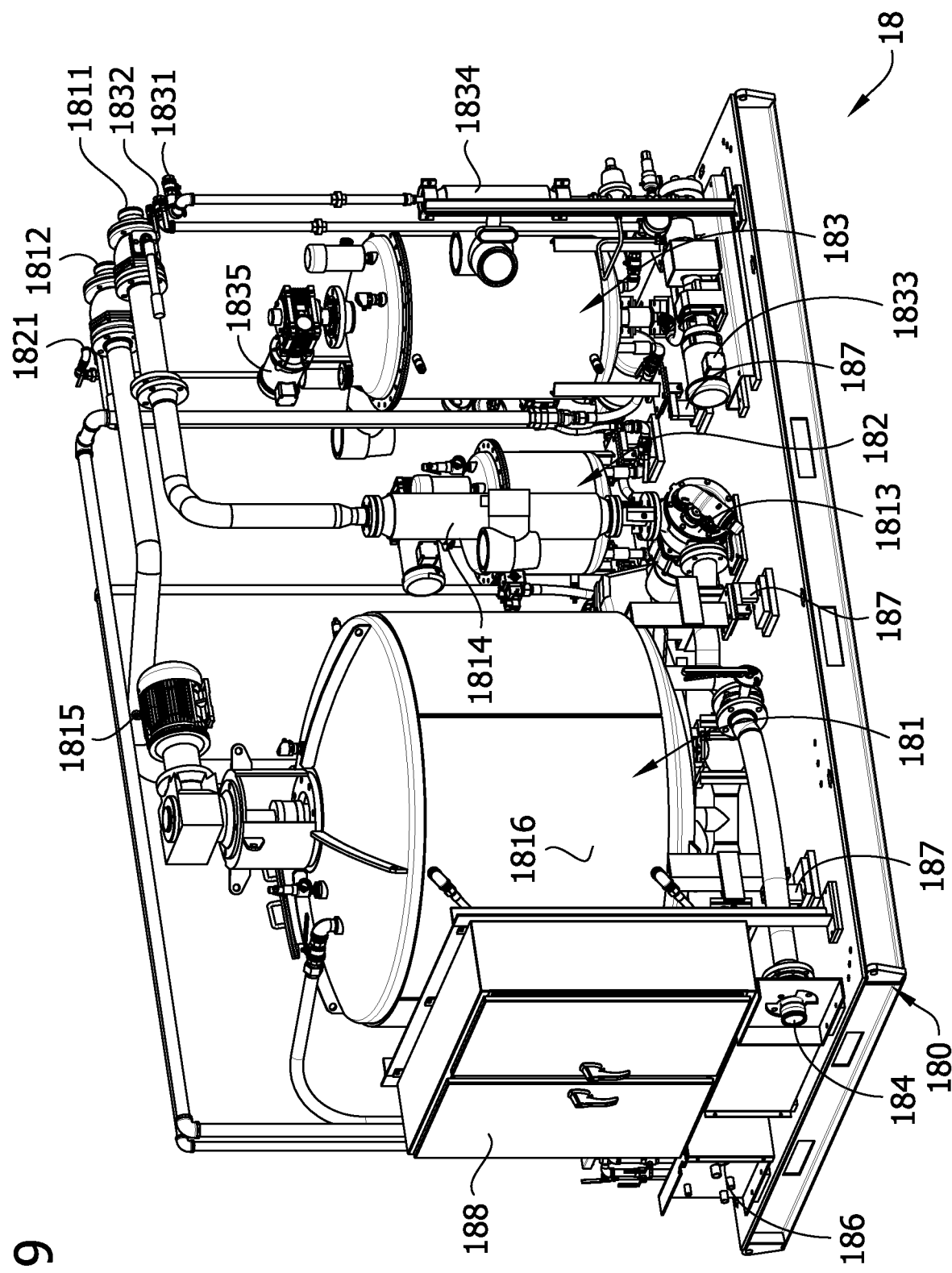
FIG. 9 is another perspective of the mixed metering module with the enclosure removed.

Referring to FIG. 7, the mixed metering module 18 comprises a skid 180 and a module enclosure 1800 mounted on the skid for enclosing the module equipment. As shown in FIGS. 8-9, inside the enclosure 1800, the mixed metering module 18 comprises a resin day tank 181, a catalyst day tank 182, and a pigment day tank 183, all mounted on the same skid 180. Each of the catalyst day tank 182 and the pigment day tank 183 broadly comprises a secondary component vessel configured for holding a secondary component of the ultimate resin mixture that will form insulation on the pipes. Secondary components are components making up a relatively small proportion of the resin mixture. In the case of the catalyst day tank 182, the secondary component is catalyst configured to catalyze the resin and thereby cure the resin mixture in the mold. The pigment day tank 183 holds pigment that adds desired color to the resin for a given application. It is contemplated that other secondary components can be stored in separate secondary component vessels and used in substantially similar ways as the catalyst and pigment day tanks 182, 183, described below, depending on process requirements.

The mixed metering module 18 comprises a resin inlet 184 (FIG. 9) and passaging connecting the resin inlet to the resin day tank 181. Although not shown, the resin inlet 184 is accessible through one of the walls of the module enclosure 1800. The resin day tank 181 is configured to be filled with conditioned resin from the conditioning module 18. Thus, one of the flexible hoses is used to fluidly connect the resin inlet 184 to the distribution outlet 166 of the resin conditioning module 16. In use, when the mixed metering unit 18 calls for resin, the conditioning module pump 167 pumps heated resin into the day tank 181 through the inlet 184. The mixed metering module 18 further comprises a resin outlet 1811, a resin recirculation inlet 1812, and passaging fluidly connecting the resin outlet and resin recirculation inlet to the resin day tank 181. Additional flexible hoses are used to connect the resin outlet 1811 and resin recirculation inlet 1812 to the mixing module 20, as described more fully below. The mixed metering module 18 further comprises a resin pump 1813 configured to pump resin from the resin day tank 181 through the resin outlet 1811 and a flowmeter 1814 configured to output a signal representative of flow of resin through the resin outlet 1811. As explained more fully below, the mixing module 20 is configured to selectively switch between (i) recirculating the pumped resin from the resin outlet 1811 back to the resin day tank 181 through the resin recirculation inlet 1812 and (ii) mixing the resin with catalyst and pigment to form the resin mixture that is then formed into pipe insulation. The illustrated mixed metering module 18 still further comprises an agitator 1815 on the resin day tank 181 that is configured to continuously or periodically agitate the resin held in the day tank 181. In some embodiments, the resin day tank 181 can include a heated jacket 1816 to maintain the resin at temperature while it is being recirculated and agitated.

The mixed metering module 18 further comprises a catalyst inlet 185 and passaging connecting the catalyst inlet to the catalyst day tank 182. The catalyst inlet 185 is configured to connect to a separate catalyst source (not shown; e.g., a standalone drum containing catalyst) to enable catalyst to be pumped into the catalyst day tank 182 through the catalyst inlet. The mixed metering module 18 has a catalyst outlet 1821, a catalyst recirculation inlet 1822, and passaging fluidly connecting the catalyst outlet and catalyst recirculation inlet to the catalyst day tank 182. Additional flexible hoses (not shown) connect the catalyst outlet 1821 and catalyst recirculation inlet 1822 to the mixing module 20. The mixed metering module 18 further comprises a catalyst pump 1823 configured to pump catalyst from the catalyst day tank 182 through the catalyst outlet 1821 and a flowmeter 1824 configured to output a signal representative of flow of catalyst through the catalyst outlet. As explained more fully below, the mixing module 20 is configured to selectively switch between recirculating the catalyst pumped through the catalyst outlet 1821 back to the catalyst day tank 182 through the catalyst recirculation inlet 1822 and mixing the catalyst with resin and pigmentation for molding. The illustrated mixed metering skid still further comprises a catalyst agitator 1825 on the catalyst day tank 182 configured to continuously or periodically agitate the catalyst held in the day tank.

The mixed metering module 18 comprises a pigment inlet 186 and passaging connecting the pigment inlet to the pigment day tank 183. The pigment inlet 185 is configured to connect to a separate pigment source (not shown; e.g., a standalone drum containing pigment) to enable pigment to be pumped into the pigment day tank 183 through the pigment inlet. The mixed metering module 18 further comprises a pigment outlet 1831, a pigment recirculation inlet 1832, and passaging fluidly connecting the pigment outlet and pigment recirculation inlet to the pigment day tank 183. Additional site-installed flexible hoses (not shown) respectively connect the pigment outlet 1831 and pigment recirculation inlet 1832 to the mixing module 20. The mixed metering module 18 further comprises a pigment pump 1833 configured to pump pigment from the pigment day tank 183 through the pigment outlet 1831 and a flowmeter 1834 configured to output a signal representative of flow of pigment through the pigment outlet. As explained more fully below, the mixing module 20 is configured to selectively switch between recirculating the pigment pumped through the pigment outlet 1831 back to the pigment day tank 183 through the pigment recirculation inlet 1832 and mixing the pigment with resin and catalyst for molding. The illustrated mixed metering skid still further comprises a pigment agitator 1835 on the pigment day tank 183 configured to continuously or periodically agitate the pgiment held in the day tank.

As those skilled in the art will understand, when reaction-cured resin is used to form pipe insulation, the catalyst must be maintained separate from the resin until immediately prior to molding. But the inventors have further recognized advantages to keeping the pigment separate from the resin until immediately prior to molding as well. Pigment is typically a ground solid particle with a high specific gravity. The inventors have found that, when this type of pigment is mixed in solution with resin, it can settle rapidly out of solution during shipping and storage. As explained above, the present invention draws resin from very large trailer-mounted tanks T. It is not feasible to re-mix pigment into the resin after it settles on the bottom of such a large tank. Thus, to ensure proper dispersal of pigmentation in the final insulation product, the inventors have employed the separate pigment tank 183 on the mixed metering module 18. In use, after the molding system 10 is set up onsite, a separate 55-gallon drum (or other suitable vessel) of pigment is agitated and then pumped into the pigment vessel 183. In certain embodiments, a drum extrusion pump (e.g., an AROTP0646S51FF47AA2 pump) is used to fully evacuate the contents of the 55 gallon drum into the pigment tank 182, thereby ensuring that now critical components remain in the drum after filling the pigment tank. The pigment vessel 183 is agitated, recirculated, and kept pressurized, in order to ensure that the pigment can always be properly mixed with the resin when called upon.

In one or more embodiments, components of the mixed metering module 18 are mounted on load cells 187 so that the weight of material being pumped to and from the day tanks 181, 182, 183 is known. In an exemplary embodiment, the mixed metering unit 18 comprises load cells 187 for the day tank 181, the catalyst tank 182, and the pigment tank 183. This allows the module 18 to calibrate the flowmeters 1814, 1824, 1834 and allow for on-the-fly adjustments to the amount of material being pumped out from the mixed metering module. Other redundant systems may be used for measuring material usage (e.g., pressure sensors, tank level sensors).

Figure 11:
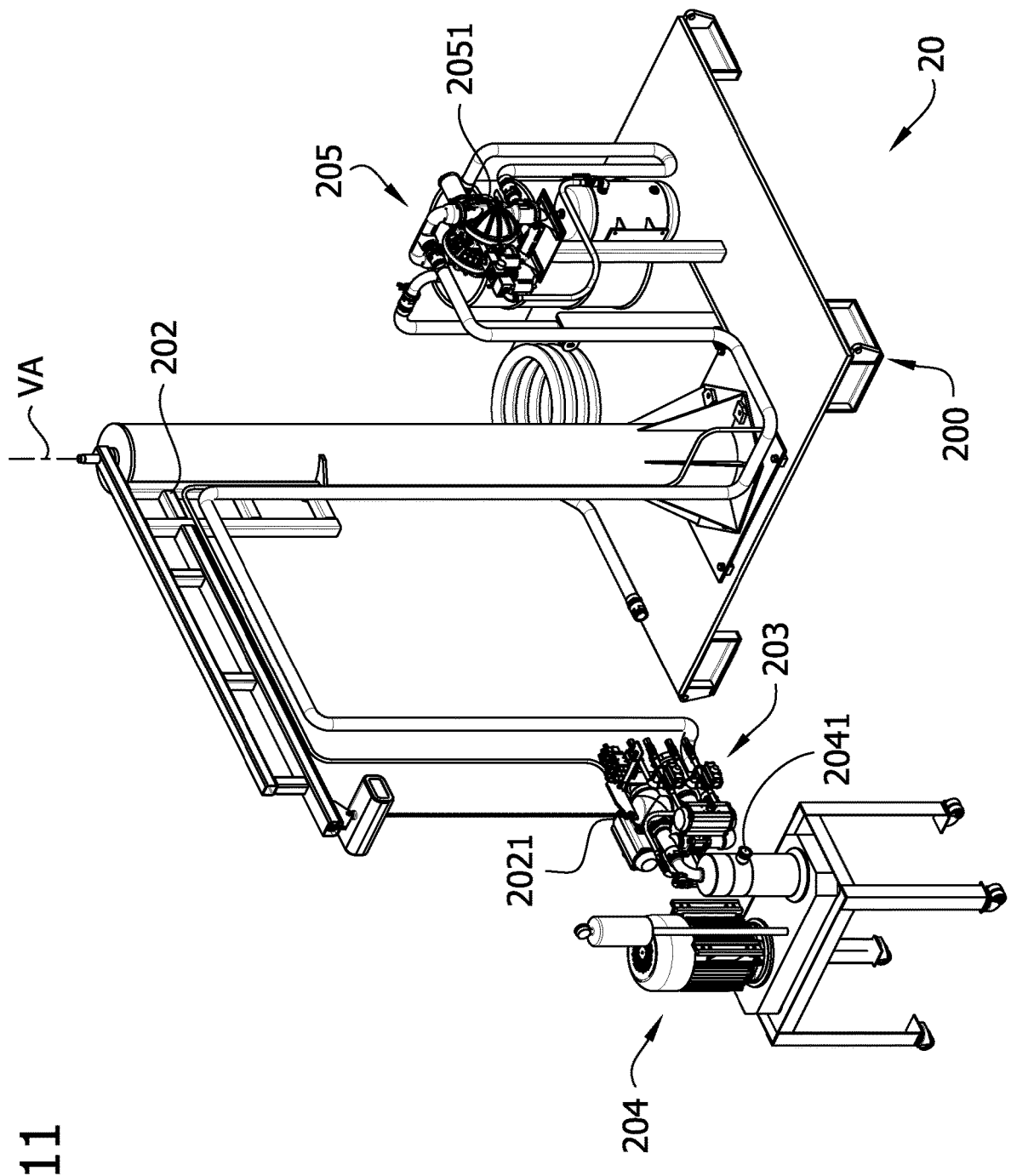
FIG. 11 is a perspective of a mixing module.

Referring to FIG. 11, the mixing module 20 comprises a skid 200, a davit arm 202 mounted on the skid, a valve unit 203 supported on the davit arm, a mixing unit 204 (broadly, mixing head) fluidly connected to the valve unit and supported separately from the skid, and a solvent tank 205 supported on the skid. In general, the davit arm 202 is configured to selectively move the valve unit 203 to a desired position. The valve unit 203 is configured to fluidly connect to the mixed metering module 18 and to selectively switch between (i) separately recirculating the resin, catalyst, and pigment to the respective day tanks 181, 182, 183 and (ii) outputting metered amounts of resin, catalyst, and pigment to the mixing unit 204. The mixing unit 204 is broadly configured to thoroughly mix the metered components and output a substantially homogenous mixture to the mold modules 22.

In the illustrated embodiment, the davit arm 202 comprises a hook 2021 that suspends the valve unit 203. The davit arm 202 is rotatable about a vertical axis VA, and the hook 2021 is suspended from a cable or chain on a winch for adjusting the vertical position of the valve unit 203. Additionally, the position of the cable/chain along the length of the davit arm 202 is adjustable so that the valve unit 203 can be moved to a desired location for any given molding site.

Figure 12:
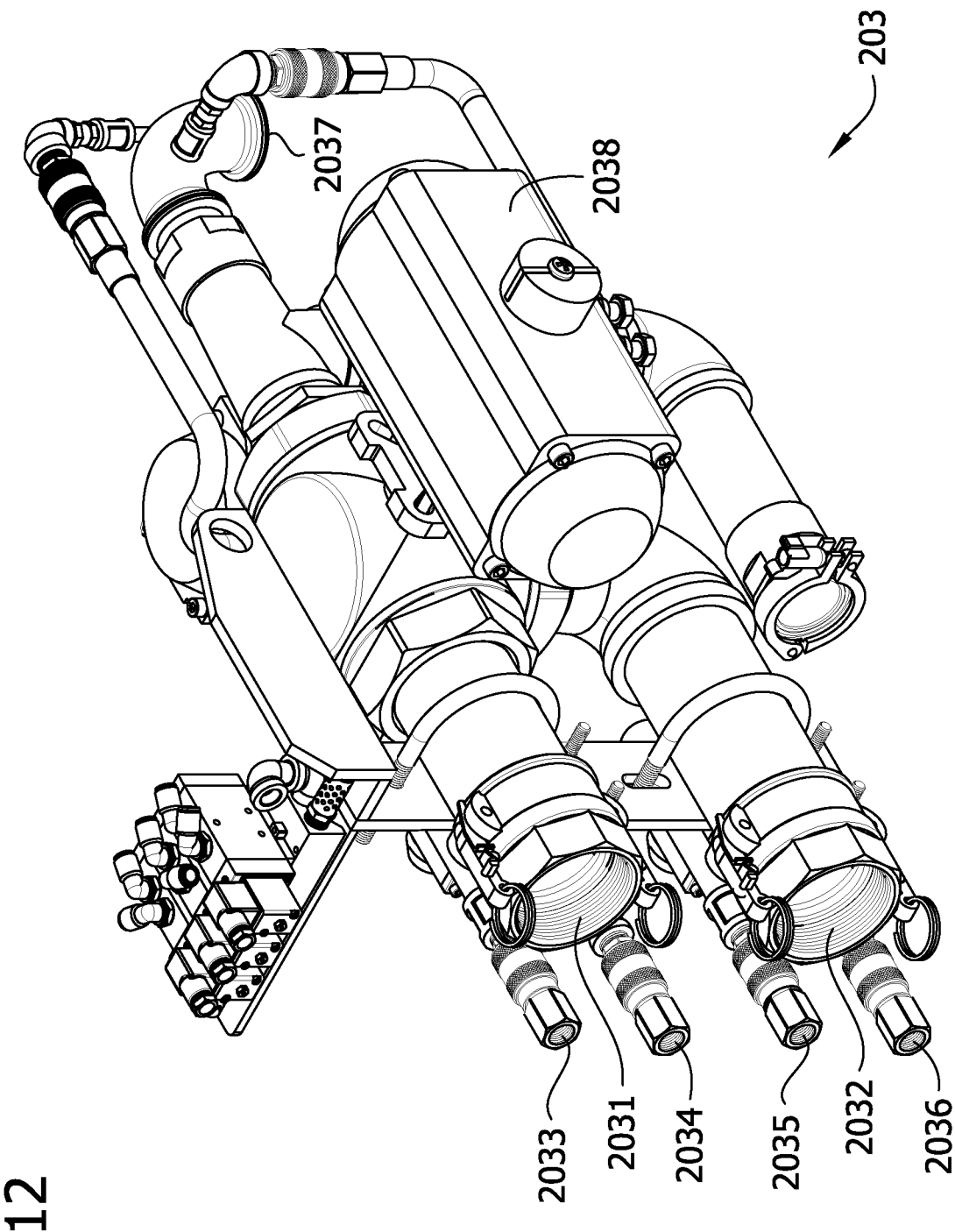
FIG. 12 is a perspective of a valve unit of the mixing module.
Figure 13:
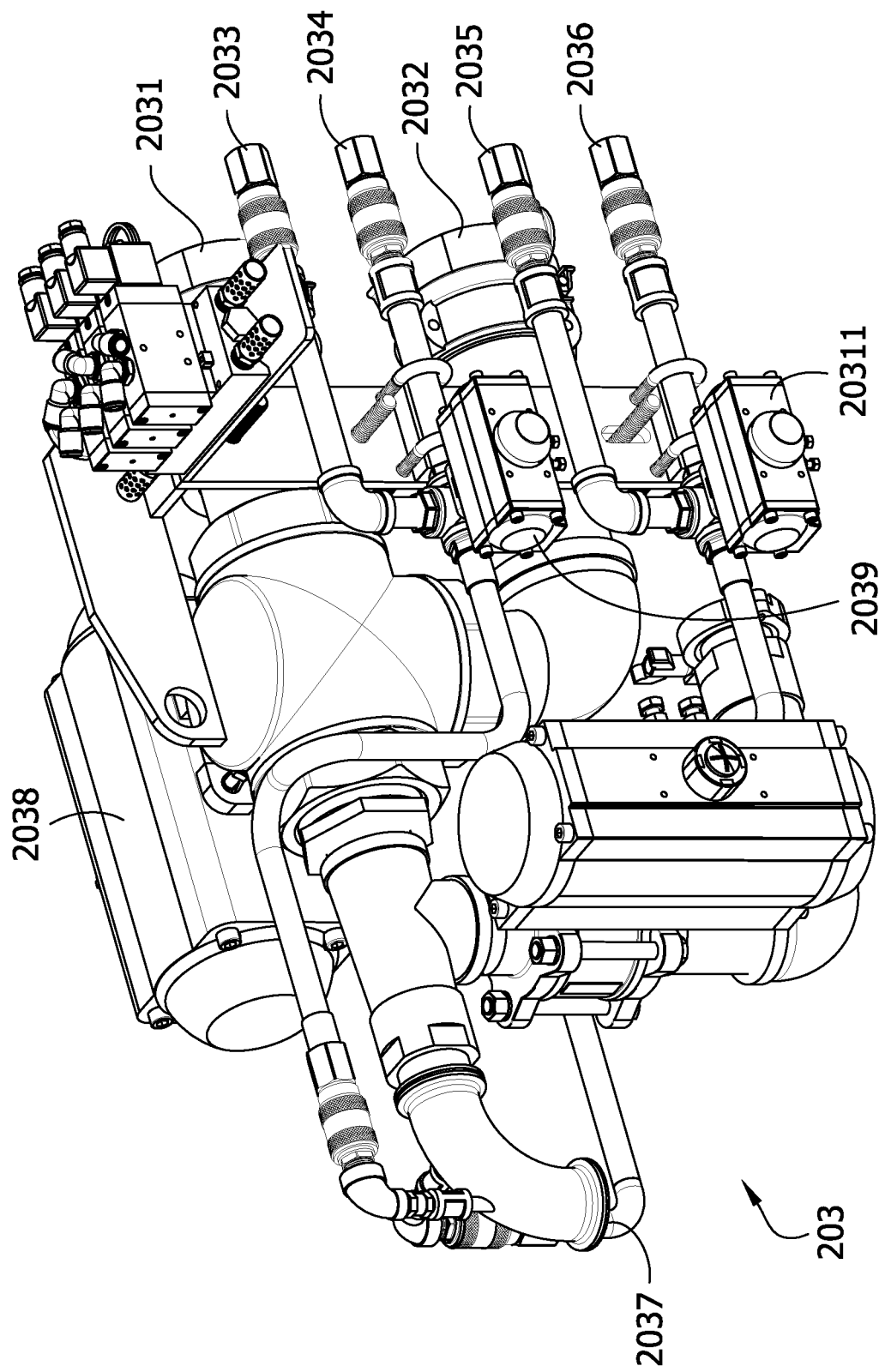
FIG. 13 is another perspective of the valve unit.

Referring to FIGS. 12 and 13, the valve unit 203 comprises a resin inlet 2031, a resin recirculation outlet 2032, a catalyst inlet 2033, a catalyst recirculation outlet 2034, a pigment inlet 2035, a pigment recirculation outlet 2036, a combined outlet 2037, and passaging fluidly connecting these inlets and outlets as described more fully below. In use, flexible hoses connect the resin inlet 2031 and a resin recirculation outlet 2032 of the valve unit 203 to the resin outlet 1811 and the resin recirculation inlet 1812 of the mixed metering unit 18. Flexible hoses also connect the catalyst inlet 2033 and the catalyst recirculation outlet 2034 of the valve unit 203 to the catalyst outlet 1821 and the catalyst recirculation inlet 1822 of the mixed metering unit. Still further flexible hoses connect the pigment inlet 2035 and the pigment recirculation outlet 2036 of the valve unit 203 to the pigment outlet 1831 and the pigment recirculation inlet 1832 of the valve unit 203. The combined outlet 2037 of the valve unit 203 connects to the mixing unit 204 as shown in FIG. 11.

The valve unit 203 further comprises a three-way resin valve 2038 configured for selectively connecting the resin inlet 2031 to the resin recirculation outlet 2032 and the combined outlet 2037, a three-way catalyst valve 2039 configured for selectively connecting the catalyst inlet 2033 to the catalyst recirculation outlet 2034 and the combined outlet 2037, and a three-way pigment valve 20311 configured for selectively connecting the pigment inlet 2035 to the pigment recirculation outlet 2036 and the combined outlet 2037. The three-way resin valve 2038 is adjustable between a recirculation position in which the valve provides fluid communication between the resin inlet 2031 and the resin recirculation outlet 2032 and a discharge position in which the valve provides fluid communication between the inlet and the combined outlet 2037. The three-way catalyst valve 2039 is adjustable between a recirculation position in which the valve provides fluid communication between the catalyst inlet 2033 and the catalyst recirculation outlet 2033 and a discharge position in which the valve provides fluid communication between the catalyst inlet and the combined outlet 2037. The three-way pigment valve 2039 likewise is adjustable between a recirculation position in which the valve provides fluid communication between the pigment inlet 2035 and the pigment recirculation outlet 2036 and a discharge position in which the valve provides fluid communication between the pigment inlet and the combined outlet 2037.

Referring again to FIG. 11, the mixing unit 204 comprises a dynamic mixer that includes a motor-driven blade that rotates inside a mixing chamber to mix the resin, catalyst, and pigment into a mixture ready for molding. As explained above, the dynamic mixer 204 connects to the combined outlet 2037 of the valve unit 203 to receive the metered streams of resin, catalyst, and pigment. The powered blade thoroughly mixes the resin, catalyst, and pigment as the fluids pass through the mixing chamber. The mixing unit 204 outputs the mixture through an outlet 2041. In one embodiment, the operator connects a flexible hose to the outlet 2041 and positions the hose so that the outlet directs the mixture into the mold modules 22 for molding. Although the illustrated mixing unit 204 comprises a dynamic mixer, it will be understood that static mixers can also be used without departing from the scope of the disclosure.

In the illustrated embodiment, the mixing module 20 further comprises solvent passaging for providing fluid communication between the solvent tank 205 and the outlet of the three-way resin valve 2038. A solvent pump 2051 is configured to selectively pump solvent from the solvent tank 205 through the solvent passaging to flush the resin mixture from the system, e.g., after each use of the mixer 204. During a flushing operation, the mixed metering skid 18 is configured to draw solvent from the upper portion of the tank 205 and recirculate the solvent through the mixing unit 204 into the lower portion of the tank. The recirculated solvent enters the solvent tank 205 in a cyclonic flow pattern. An internal baffle (not shown) provides gravity separation of solids entrained in the cyclonically flowing solvent so that the solvent drawn from the upper portion of the barrel is substantially free of solids. It can be seen that the solvent tank 205 enables flushing of the mixing unit 204 without removing or disconnecting the mixing unit from the mixing module 20 or larger molding system 10.

Figure 15:
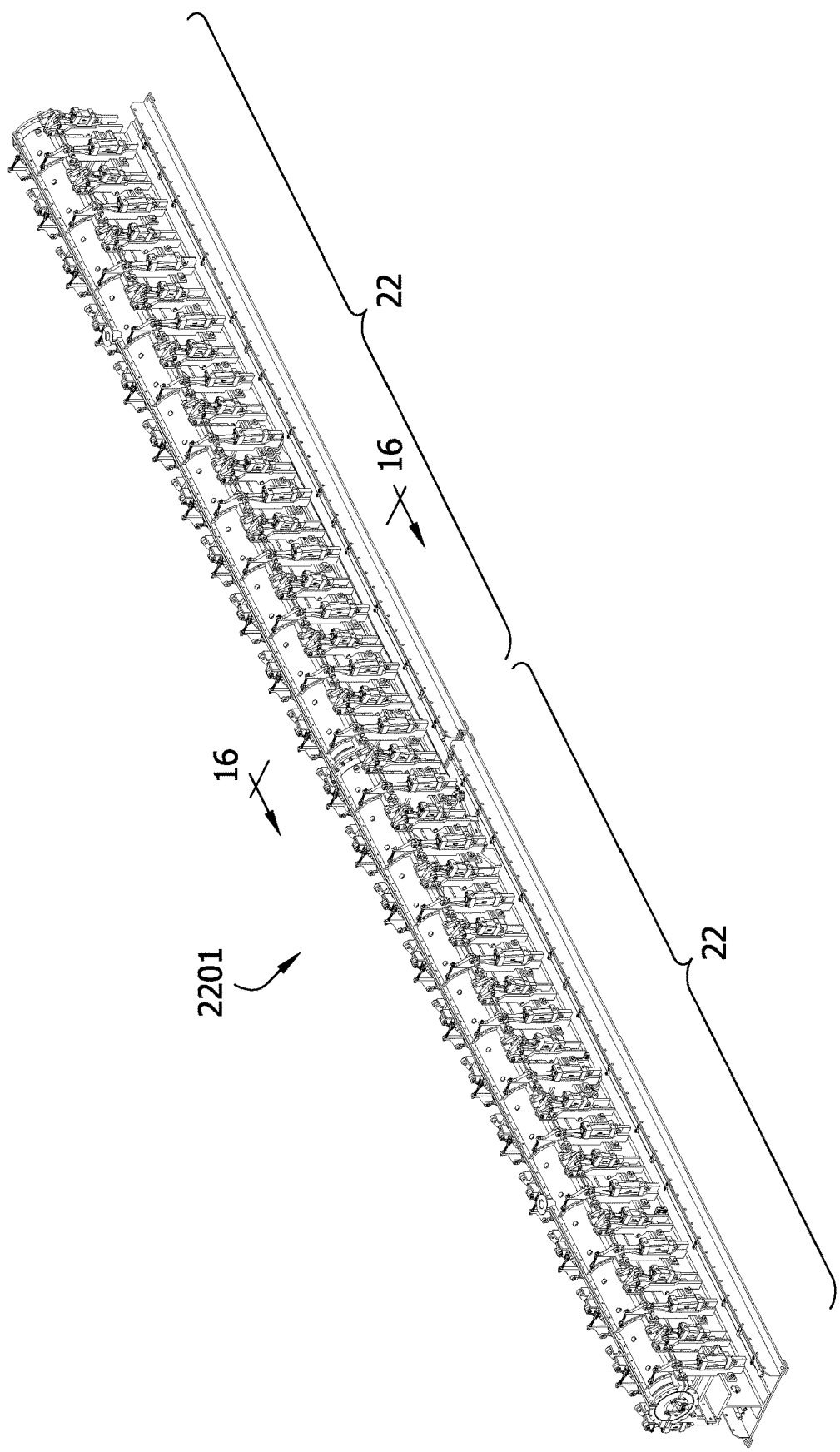
FIG. 15 is a perspective of a mold of the portable molding system.
Figure 16:
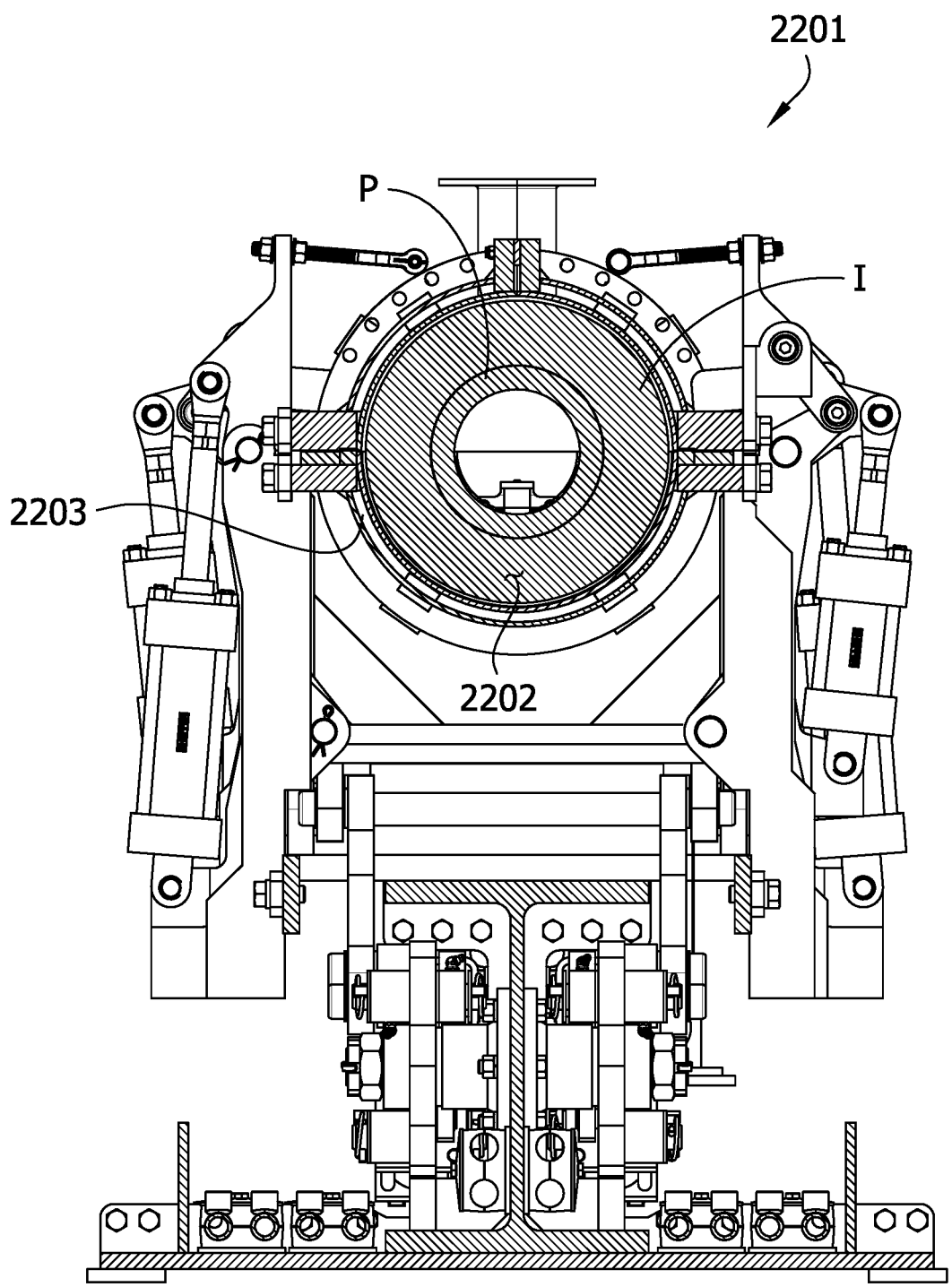
FIG. 16 is a cross section taken in the plane of line 16-16 of FIG. 15.

Referring to FIGS. 15 and 16, each mold module 22 comprises a multi-part mold assembly generally of the type described in U.S. Pat. No. 10,357,907. A plurality of mold modules 22 can be coupled together end-to-end at the molding site to form molds 2201 of various lengths. The molds 2201 may be configured to adjust in shape to match the shape of a pipe P received therein, as described in U.S. Provisional Patent Application No. 63/132,698, which is hereby incorporated by reference in its entirety for all purposes. In an exemplary embodiment, each mold module 22 is about 22 feet in length. Thus, the mold modules 22 can be assembled together to form a 44-foot mold, 66-foot mold, or an 88-foot mold, for example. When the mold modules 22 are assembled together to form molds 2201 of the desired length, each mold is configured to support a pipe P so that the mold defines an annular mold cavity 2202 around the pipe. Mixed resin from the mixing unit 201 can be deposited into the mold cavity, where it cures to form insulation I on the pipe P. After the insulation is formed, the mold 2201 can be opened and the insulated pipe removed.

In the illustrated embodiment, each mold module 22 comprises double-wall mold parts defining a fluid annulus 2203 outside of the mold cavity 2202. The mold 2201 is configured to receive temperature control fluid from the temperature control module 24 in the annulus 2203 to control the temperature of the mold during molding. Exemplary constructional details of a double-wall mold construction encompassed in the scope of this disclosure are described more fully in U.S. Provisional Patent Application No. 63/132,698, which was previously incorporated by reference.

Figure 14:
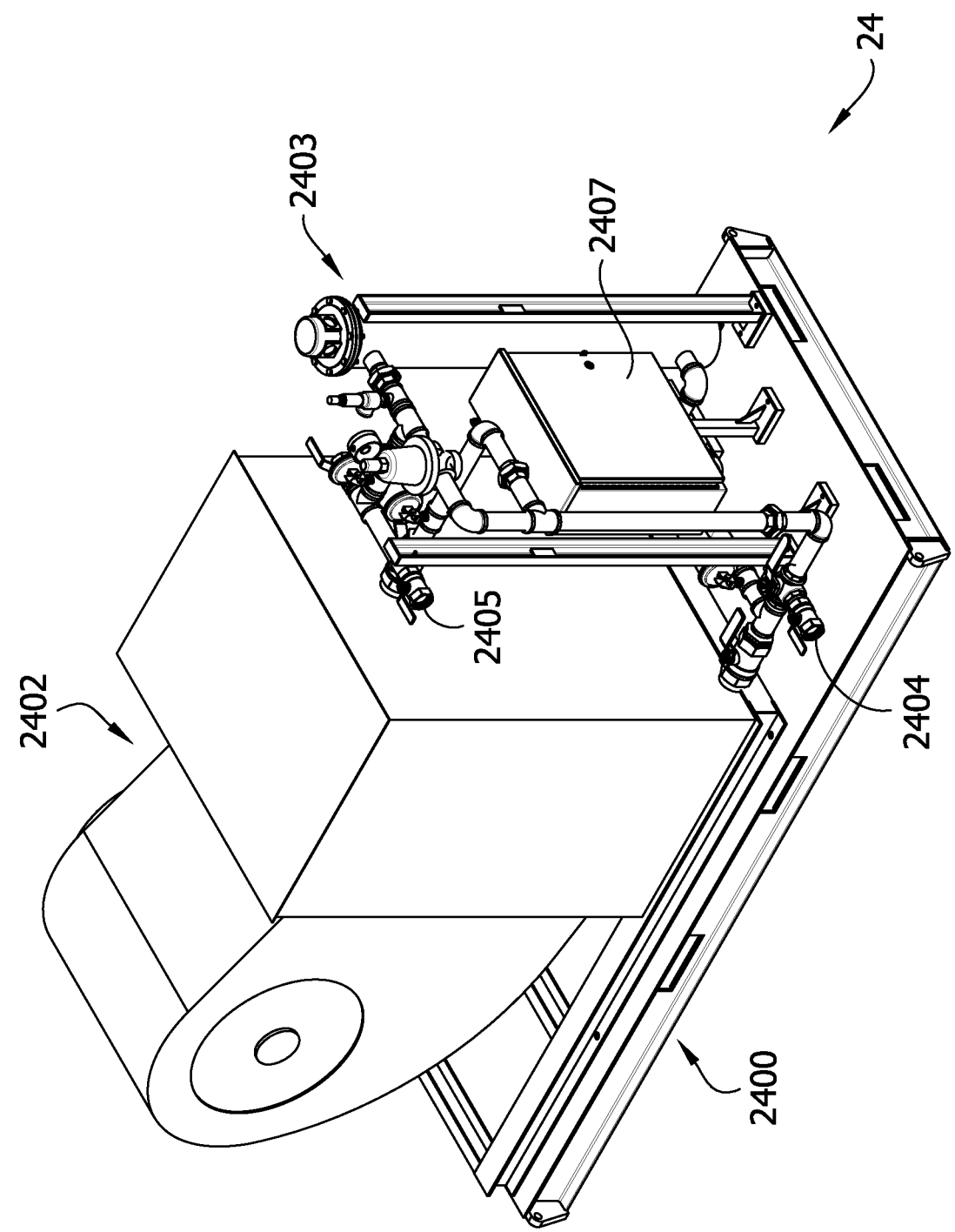
FIG. 14 is a perspective of a temperature control module of the portable molding system.

Referring to FIG. 14, the temperature control module 24 comprises a skid 2400, a cooling tower 2402 for selectively cooling the temperature control fluid, and a heater 2403 for selectively heating the temperature control fluid. The temperature control module comprises an inlet 2404 and an outlet 2405 configured to fluidly connect the temperature control module to the fluid annulus 2203 (e.g., via site-installed flexible hoses). A temperature control fluid pump is configured to recirculate fluid from the temperature control module 24 through the fluid annulus 2203. One or more control valves can be used to selectively direct the recirculating temperature control fluid to flow through either the cooling tower 2402 or the heater 2403. Thus, depending on the application, the temperature control module 24 is configured for selectively recirculating the thermal control fluid to the annulus in the mold unit in either a chilling mode in which the temperature control skid recirculates the thermal control fluid through the cooling tower 2402 and a heating mode in which the temperature control skid recirculates the thermal control fluid through the heater 2403. The illustrated temperature control module 24 comprises an enclosed control processor 2407 supported on the skid 2400. The control processor 2407 can execute thermostatic control of the temperature control module 24 to maintain the temperature control fluid at desired temperatures.

Portable molding systems in the scope of the present disclosure can be deployed with varying degrees of automation and control integration. For example, in one or more embodiments, there is a common control system controlling all of the modules 12, 14, 16, 18, 20, 22, 24 of the molding system. In other embodiments, it is contemplated that the individual modules could be run in a more independent fashion with more operator intervention into the control of each module to direct each stage of a pipe molding process. Referring again to FIGS. 8 and 9, in the illustrated embodiment, the mixed metering module 18 comprises a supervisory control processor 188 configured to exercise substantial supervisory control over the process.

The supervisory control processor 188 is configured to control the mixed metering module 18 and mixing module 20 together so that a properly metered resin mixture is delivered to the mold on command. The mixed metering module 18 is operatively connected to the flowmeters 1814, 1824, 1834, the load cells 187, and optional pressure/level sensors on the mixed metering module 18 to receive measurement output from these devices. The supervisory control processor 188 uses these signals to control the pumps 1813, 1823, 1833, the valves 2038, 2039, 20311, and the dynamic mixer 204 for selectively recirculating, metering, and mixing the resin, catalyst, and pigmentation in accordance with process demands. In one or more embodiments, the control processor 188 receives indications or process demands by user input to a control panel in the same enclosure with the control processor 188. When there is no call for resin at the mold modules 22, the control processor 188 keeps the valves 2038, 2039, 20311 in their recirculation positions and keeps the pumps 1813, 1823, 1833 active so that the resin, catalyst, and pigment are continuously pumped through separate recirculation loops. When there is a call for resin at the mold modules 22, the control processor 188 switches the valves 2038, 2039, 20311 to the discharge positions, activates the dynamic mixer 204, and controls the pumps 1813, 1823, 1833 based on feedback from the flowmeters 1814, 1824, 1834 to direct metered amounts of resin, catalyst, and pigment from the mixed metering module 18 through the valve unit 203 and through the mixer 204. The active mixer 204 thoroughly mixes the components and discharges mixed resin suitable for molding. During use, the supervisory control processor 188 can determine if there is a discrepancy between the outputs of the flowmeters 1814, 1824, 1834, the load cells 187, or other pressure or level measurement devices and output an alarm message if the compared readings diverge by more than a predetermined amount.

The control processor 188 is also configured to flush the mixed resin from molding system 10 after the molds 2201 are filled. Each time a mold is filled, the control processor 188 can switch the valves 2038, 2039, 20311 to the recirculation positions and activate the solvent pump 2051. The pump 2051 pumps solvent from the solvent tank 205 through the outlet 2037 of the valve unit 203 and through the dynamic mixer 204 to remove substantially all of the resin mixture from the molding system 10. In an exemplary embodiment, the processor 188 is configured to keep the dynamic mixer 204 active while flushing the mixer with solvent.

In certain embodiments, the supervisory control processor 188 is operatively connected to one or more additional control processors 122, 161, 2407 of the molding system 10 for issuing control commands for controlling the corresponding modules 12, 16, 24. For example, based on user input to the control panel and various feedback signals from throughout the molding system, the supervisory control processor might direct the transfer pump module control processor 122 to fill the resin intermediate storage tank module 14, switch the resin conditioning module 16 between the recirculation and distribution modes, direct the temperature control module 24 to cool or heat the mold 2201, etc.

An exemplary method of using the transportable molding system 10 to form insulated pipes will now be briefly described. Initially, the operator ships the transportable process modules 12, 14, 16, 18, 20, 22, 24 to a molding site in standard-size shipping containers C. As explained above, to deploy the molding system 10 onsite, the operator positions each of the modules 12, 14, 16, 18, 20, 22, 24 at the best available locations onsite, connects the modules to onsite power, makes releasable (e.g., wired) communication connections between the modules, and makes releasable fluid connections (e.g., flexible tube connections) between the modules. When the modules 12, 14, 16, 18, 20, 22, 24 are connected in this fashion, the user can use the molding system 10 to form the desired number of insulated pipes.

In a typical molding process, the transfer pump module 12 first transfers resin from the tank farm T into the resin intermediate storage tank module 14. When the resin intermediate storage tank module 14 is filled, the resin conditioning module 16 can begin to recirculate and condition the resin. When there is a call for resin in the resin day tank 181 of the mixed metering module 18, the valve 168 of the conditioning module 16 switches from the recirculation position to the distribution position. Conditioned resin then flows into the day tank 181 where the temperature control jacket 1816 maintains temperature. Initially, the control processor 188 can position the three-way resin valve 2038 in the recirculation position and activate the pump 1813 to continuously circulate and agitate the resin until there comes a call for resin at a mold 2201. The catalyst day tank 182 and the pigment day tank 183 are filled as described above and likewise agitated and recirculated through their respective recirculation loops until there is a call for mixed resin at the mold 2201.

A pipe to be coated is positioned in the mold cavity 2202 and the mold 2201 is closed. To begin molding, the control processor 188 switches the valves 2038, 2039, 20311 of the valve unit 203 to the discharge positions so that the resin, catalyst, and pigment flow through the valve unit 203 to the mixing unit 204. The control processor 188 controls the pumps 1813, 1823, 1833 based on output of the flowmeters 1814, 1824, 1834 to ensure that the proper proportions of each component are being imparted through the valve unit 203 and the mixing unit 204. The control processor 188 activates the dynamic mixer to thoroughly mix the resin with catalyst and pigment. The mixing unit 204 outputs mixed resin to the mold 2201 until the mold is filled. Subsequently, the control processor 188 switches the valves 1813, 1823, 1833 back to the recirculation positions and activates the solvent pump 2051 to flush the residual mixed resin from the molding system 10. This process is repeated as many times as is needed to create the desired number of insulated pipes at the molding site.

When there is no longer a need for the molding system 10 at the molding site, the modules 12, 14, 16, 18, 20, 22, 24 are disconnected (e.g., the flexible hoses and Ethernet cables are removed). Then, the operator then packs the modules 12, 14, 16, 18, 20, 22, 24 in standard shipping containers C and ships the containers to a storage location or to another molding site where they are redeployed.

Figure 10:
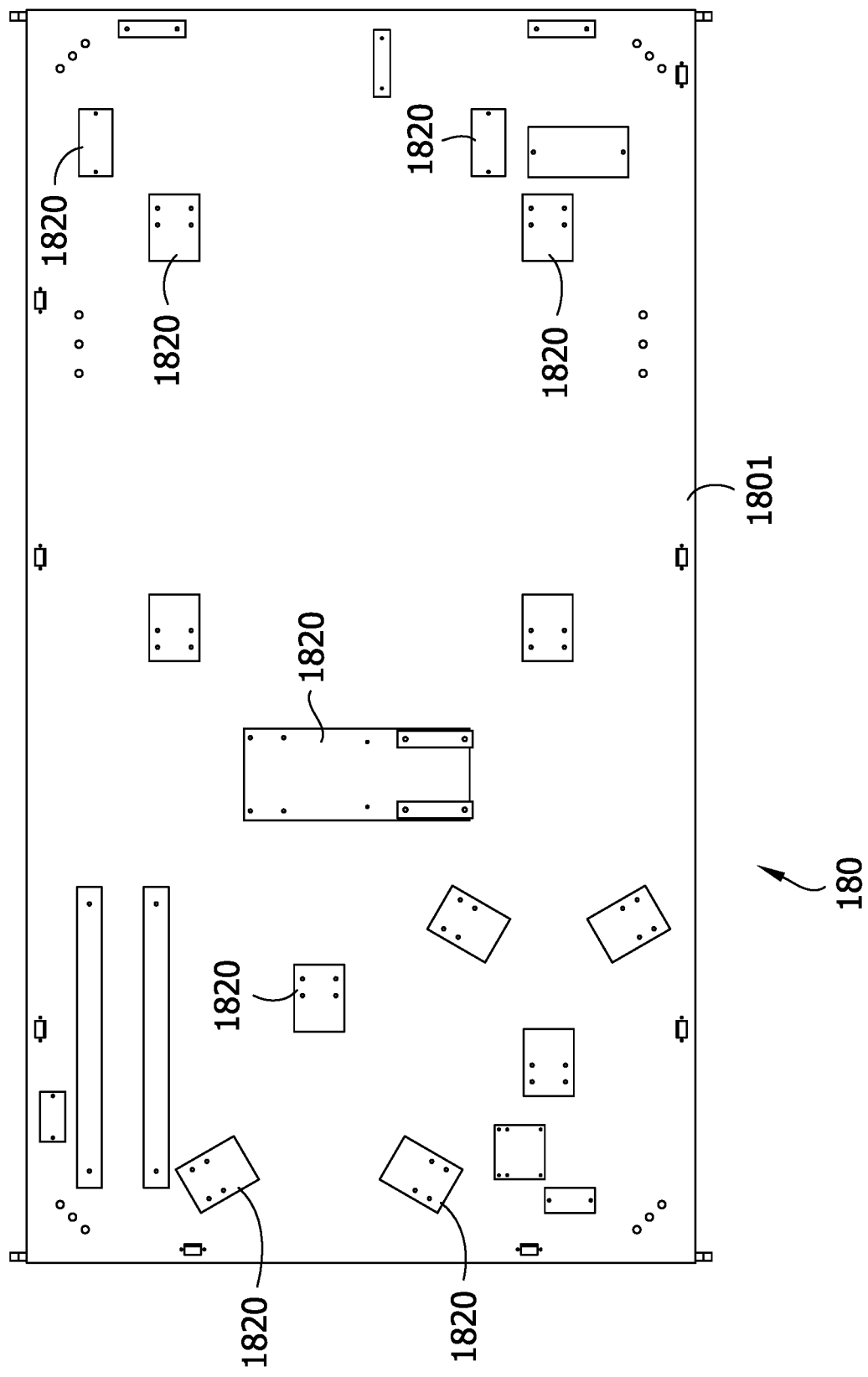
FIG. 10 is a top plan view of a skid of the mixed metering module.

Referring to FIG. 10, an exemplary method making a skid-mounted process module for use in a portable molding system 10 will now be described. FIG. 10 depicts the skid 180 of the mixed metering module 18 to provide an exemplary illustration of the manufacturing method. The manufacturing method described hereafter is particularly well-suited for modules such as the mixed metering module 18 that include one or more components mounted on load cells 187. In particular, the below-described manufacturing process is thought to enable consistent manufacture of the module 18 with zero stress on each load cell 187 so that load cells output reliable and accurate load signals for use in calibrating the flowmeters 1814, 1824, 1834. Although the illustration shows how the manufacturing process can be used to form a mixed metering module skid 180 with components supported on load cells 187, it will be understood that the same process can also be used to manufacture other transportable process modules, including modules with no components supported on load cells.

The manufacturer initially forms a skid base 1801 and paints all surfaces except for the top of the skid base. Initially, the manufacturer tack welds mounting plates 1820 for each of the components to be mounted on the skid base at predefined positions along the skid base 1801. For example, the illustrated mixed metering skid 18 comprises a mounting plate 1820 for each leg (broadly, mounting point) of the resin day tank 181, the catalyst day tank 182, and the pigment day tank 183. Mounting plates for other components are also shown. Suitably, the mounting plates may be pre-threaded in a pattern to match the pattern of connection points on the corresponding equipment. The manufacturer positions the equipment on the skid base 1801 at predefined positions. If any of the mounting plates 1820 are not properly aligned with the respective legs (which could impart undesired stress on the corresponding load cell 187), the manufacturer can break the tack(s) and reposition the mounting plate(s) 1820 at the locations which properly align with the respective legs. The manufacturer then tacks the loose, repositioned plates 1820 into place at the proper positions. Once the positions of all of the mounting plates 1820 have been confirmed/set in this manner, the manufacturer can permanently mount the mounting plates in position by forming a weld around substantially the entire perimeter of each plate 1820. Typically, the manufacturer will remove the equipment before forming the final permanent welds. Finally, the top of the skid base 1801 can be painted and the equipment can be fastened to the respect mounting plates, e.g., on top of the load cells 187.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A portable molding system configured for forming insulation on pipes of lengths in excess of 20 feet, the portable molding system comprising:
   a set of transportable process modules configured to be shipped to a molding site, operatively connected together at the molding site to form a site-installed molding system, and subsequently disconnected for transport to another site, the set of transportable process modules including:
      one or more resin preparation modules configured to prepare resin for being formed into insulation on the pipes; and
      one or more mold modules configured to provide a pipe insulation mold having a length extending from a first end portion to a second end portion of at least 35 feet and defining a mold cavity extending along the length from the first end portion to the second end portion, the one or more mold modules configured to hold an individual pipe in the mold cavity, to receive resin prepared by the one or more resin preparation modules in the mold cavity around the individual pipe, and to form said resin received in the mold cavity into insulation on at least a middle portion of the individual pipe;
   wherein each of the set of transportable process modules is configured to be transported in a standard shipping container having a width of less than or equal to 96 inches (about 244 cm) and a height of less than or equal to 102 inches (about 260 cm).

2. The portable molding system as set forth in claim 1, wherein at least some of the transportable process modules are skid-mounted modules.

3. The portable molding system as set forth in claim 1, wherein a plurality of the transportable process modules are active modules, each active module comprising a dedicated control processor.

4. The portable molding system as set forth in claim 3, wherein one of the dedicated control processors comprises a supervisory control processor for the site-installed molding system, wherein the dedicated control processors are configured to be connected at the molding site by hardwired communication cables such that control of the active modules is coordinated by the supervisory control processor.

5. The portable molding system as set forth in claim 1, wherein the transportable process modules are configured to be fluidly connected by flexible hoses.

6. The portable molding system as set forth in claim 1, wherein the set of transportable process modules comprises one or more resin transfer modules configured to transfer the resin from bulk storage at the molding site to the one or more resin preparation modules.

7. The portable molding system as set forth in claim 6, wherein the one or more resin transfer modules comprise a transfer pump module and an intermediate storage tank module, the transfer pump module configured to pump resin from the bulk storage into the intermediate storage tank module.

8. The portable molding system as set forth in claim 6, wherein the one or more resin transfer modules comprises an intermediate storage tank module, the intermediate storage tank module comprising a first inlet through which the intermediate storage tank module is configured to receive resin transferred from the bulk storage, an outlet through which the resin intermediate storage tank module is configured to output resin to the one or more resin preparation modules, and a second inlet through which the intermediate storage tank module is configured to receive resin recirculated from the one or more resin preparation modules.

9. The portable molding system as set forth in claim 1, wherein the one or more resin preparation modules comprises a mixed metering module configured to meter the resin received from the one or more resin transfer modules with a secondary component.

10. The portable molding system as set forth in claim 9, wherein the secondary component is one or both of catalyst and pigment.

11. The portable molding system as set forth in claim 9, wherein the mixed metering module comprises a resin day tank configured to hold unmixed resin and a secondary component vessel configured to hold the secondary component.

12. The portable molding system as set forth in claim 11, wherein the resin preparation module further comprises a mixing module, the mixing module including a valve unit and a mixing unit, the valve unit being operatively connected between the mixing unit and the mixed metering module.

13. The portable molding system as set forth in claim 12, wherein the valve unit includes a resin valve and a secondary component valve, each of the resin valve and the secondary component valve being selectively adjustable to a recirculation position and a discharge position, wherein when the resin valve and the secondary component valve are in the recirculation positions, resin and secondary component from the mixed metering module recirculate through the valve unit to the resin day tank and the secondary component vessel, and wherein when the resin valve and the secondary component valve are in the discharge positions, metered amounts or resin and secondary component from the mixed metering module flow through the valve unit to the mixing unit.

14. The portable molding system as set forth in claim 13, wherein the mixing unit comprises a dynamic mixer configured to mix the resin with the secondary component form mixed resin usable for forming insulation on the pipes.

15. The portable molding system as set forth in claim 13, wherein the mixing module comprises a solvent tank for holding solvent, the mixing module configured to flush the mixing unit with solvent from the solvent tank without separating the mixing unit from the mixing module.

16. The portable molding system as set forth in claim 11, wherein the mixed metering module further comprises at least one load cell operatively connected to at least one of the resin day tank and the secondary component vessel, each load cell configured to output a load signal representative of a weight of said at least one of the resin day tank and the secondary component vessel.

17. The portable molding system as set forth in claim 16, wherein the mixed metering module comprises a resin flowmeter configured to output a resin flow signal representative of resin flow from the mixed metering module, a secondary component flowmeter configured to output a secondary component flow signal representative of secondary component flow from the mixed metering module, and a control processor operatively connected to the resin flowmeter, the secondary component flowmeter, and the at least one load cell for receiving the resin flow signal, the secondary component flow signal, and the load signal, wherein the load signal provides a standard against which accuracy of at least one of the resin flowmeter and the secondary component flowmeter can be evaluated and/or against which at least one of the resin flowmeter and the secondary component flowmeter can be calibrated.

18. The portable molding system as set forth in claim 1, wherein each of the one or more mold modules comprises a double-walled mold defining a temperature control annulus.

19. The portable molding system as set forth in claim 18, wherein the set of transportable process modules further comprises a temperature control module fluidly connected to the temperature control annulus for imparting temperature control fluid into the temperature control annulus.

20. The portable molding system as set forth in claim 19, wherein the temperature control module comprises a chiller and a heater.

21. A method of forming insulated pipes using the portable molding system of claim 1, the method comprising:
shipping the set of transportable process modules of the portable pipe insulation molding system to a molding site;
making releasable communication connections between the transportable process modules at the molding site;
making releasable fluid connections between the plurality transportable process modules at the molding site;
imparting resin from a bulk resin storage source at the molding site to transportable process modules;
using the transportable process modules to condition the resin, mix the conditioned resin with catalyst, and impart the mixed resin into a mold cavity around a pipe at the molding site; and
curing the resin in the mold cavity to form an insulated pipe at the molding site.

22. A portable molding system configured for forming insulation on pipes of lengths in excess of 20 feet, the portable molding system comprising:
a set of transportable process modules configured to be shipped to a molding site, operatively connected together at the molding site to form a site-installed molding system, and subsequently disconnected for transport to another site, the set of transportable process modules including:
one or more resin preparation modules configured to prepare resin for being formed into insulation on the pipes; and
one or more mold modules configured to define a mold cavity, the one or more mold modules configured to hold a pipe in the mold cavity, to receive resin prepared by the one or more resin preparation modules in the mold cavity around the pipe, and to form said resin received in the mold cavity into insulation on the pipe;
wherein the set of transportable process modules comprises one or more resin transfer modules configured to transfer the resin from bulk storage at the molding site to the one or more resin preparation modules;
wherein the one or more resin transfer modules comprises an intermediate storage tank module, the intermediate storage tank module comprising a first inlet through which the intermediate storage tank module is configured to receive resin transferred from the bulk storage, an outlet through which the resin intermediate storage tank module is configured to output resin to the one or more resin preparation modules, and a second inlet through which the intermediate storage tank module is configured to receive resin recirculated from the one or more resin preparation modules;

wherein the intermediate storage tank module comprises a hatch and a hatch cover covering the hatch, each of the first inlet and the second inlet being formed through the hatch cover.

23. The portable molding system as set forth in claim 22, wherein the intermediate storage tank module further comprising a vent port formed through the hatch cover.

24. The portable molding system as set forth in claim 8, wherein the one or more resin preparation modules comprises a resin conditioning module comprising a heat exchanger, the resin conditioning module configured to receive the resin from the intermediate storage tank module and bring the resin to a temperature suitable for molding.

25. The portable molding system as set forth in claim 24, wherein the resin conditioning module is selectively operable in either of a recirculation mode and a pass-through mode, wherein in the recirculation mode, the resin conditioning module is configured to continuously recirculate conditioned resin to the intermediate storage tank, and wherein in the pass-through mode, the resin conditioning module is configured to bring the resin to the temperature suitable for molding in one pass through the resin conditioning module to the one or more mold modules.

26. A portable molding system configured for forming insulation on pipes of lengths in excess of 20 feet, the portable molding system comprising:

a set of transportable process modules configured to be shipped to a molding site, operatively connected together at the molding site to form a site-installed molding system, and subsequently disconnected for transport to another site, the set of transportable process modules including:

one or more resin preparation modules configured to prepare resin for being formed into insulation on the pipes; and one or more mold modules configured to define a mold cavity, the one or more mold modules configured to hold a pipe in the mold cavity, to receive resin prepared by the one or more resin preparation modules in the mold cavity around the pipe, and to form said resin received in the mold cavity into insulation on the pipe;

wherein each of the set of transportable process modules is configured to be transported in a standard shipping container having a width of less than or equal to 96 inches (about 244 cm) and a height of less than or equal to 102 inches (about 260 cm); and wherein the one or more mold modules comprises at least first and second mold modules configured to be connected end-to-end at the molding site to define a common mold cavity in which to receive one pipe at a time.

* * * * *

UNITED STATES PATENT AND TRADEMARK OFFICE
CERTIFICATE OF CORRECTION

| | | |
|---|---|---|
| PATENT NO. | : 11,999,089 B2 | Page 1 of 1 |
| APPLICATION NO. | : 17/505191 | |
| DATED | : June 4, 2024 | |
| INVENTOR(S) | : Perkins et al. | |

It is certified that error appears in the above-identified patent and that said Letters Patent is hereby corrected as shown below:

On the Title Page

Item (12) "Perkins" should read:
-- Perkins et al. --.

Item (72) Inventors should read:
(72) Inventor: Randall Perkins, Houston, TX (US);
        Douglass Findley, Broussard, LA (US).

Signed and Sealed this
Eighth Day of October, 2024

*Katherine Kelly Vidal*

Katherine Kelly Vidal
*Director of the United States Patent and Trademark Office*